(12) United States Patent
McIntosh et al.

(10) Patent No.: US 9,530,452 B2
(45) Date of Patent: Dec. 27, 2016

(54) VIDEO PREVIEW CREATION WITH LINK

(71) Applicant: REDUX, INC., Berkeley, CA (US)

(72) Inventors: David McIntosh, Del Mar, CA (US); Chris Pennello, Berkeley, CA (US)

(73) Assignee: ALC HOLDINGS, INC., San Francisco, CA (US)

( * ) Notice: Subject to any disclaimer, the term of this patent is extended or adjusted under 35 U.S.C. 154(b) by 0 days.

(21) Appl. No.: 14/173,697

(22) Filed: Feb. 5, 2014

(65) Prior Publication Data
US 2014/0223482 A1 Aug. 7, 2014

Related U.S. Application Data

(60) Provisional application No. 61/761,096, filed on Feb. 5, 2013, provisional application No. 61/822,105, filed (Continued)

(51) Int. Cl.
| | |
|---|---|
| H04N 7/10 | (2006.01) |
| H04N 5/445 | (2011.01) |
| G11B 27/031 | (2006.01) |
| G11B 20/00 | (2006.01) |
| G11B 27/034 | (2006.01) |
| G11B 27/036 | (2006.01) |
| H04N 5/04 | (2006.01) |
| G06F 3/0484 | (2013.01) |
| H04N 21/482 | (2011.01) |

(Continued)

(52) U.S. Cl.
CPC ........... *G11B 27/031* (2013.01); *G06F 3/0484* (2013.01); *G06F 3/04842* (2013.01); *G06F 3/04855* (2013.01); *G06K 9/00751* (2013.01); *G11B 20/00007* (2013.01); *G11B 27/034* (2013.01); *G11B 27/036* (2013.01); *G11B 27/102* (2013.01); *G11B 27/105* (2013.01); *G11B 27/34* (2013.01); *H04N 5/04* (2013.01); *H04N 21/47217* (2013.01); *H04N 21/482* (2013.01); *H04N 21/8455* (2013.01); *H04N 21/8549* (2013.01)

(58) Field of Classification Search
CPC ... H04N 21/8549; H04N 21/85; H04N 21/854
USPC .............................................. 725/37, 32, 41
See application file for complete search history.

(56) References Cited

U.S. PATENT DOCUMENTS

| | | | | |
|---|---|---|---|---|
| 6,526,577 | B1 * | 2/2003 | Knudson | H04N 5/44543 348/E5.104 |
| 7,840,661 | B2 * | 11/2010 | Kalaboukis | G06F 17/30876 709/223 |

(Continued)

OTHER PUBLICATIONS

Restriction Requirement, dated Jun. 19, 2015, for U.S. Appl. No. 14/173,740, filed Feb. 5, 2014, 8 pages.

(Continued)

*Primary Examiner* — James R Sheleheda
(74) *Attorney, Agent, or Firm* — Kilpatrick Townsend & Stockton LLP

(57) ABSTRACT

Providing a method for creating and displaying portions of videos called video previews. The video previews may be associated with a link to a full video, such that the video preview is generated from a portion of the full video. The video previews are configured to play a series of images associated with images from the portion of the full video when the video preview is activated.

26 Claims, 12 Drawing Sheets

Related U.S. Application Data on May 10, 2013, provisional application No. 61/847,996, filed on Jul. 18, 2013, provisional application No. 61/905,772, filed on Nov. 18, 2013.

(51) Int. Cl.
  *H04N 21/8549* (2011.01)
  *G11B 27/34* (2006.01)
  *H04N 21/472* (2011.01)
  *H04N 21/845* (2011.01)
  *G11B 27/10* (2006.01)
  *G06F 3/0485* (2013.01)
  *G06K 9/00* (2006.01)

(56) References Cited

U.S. PATENT DOCUMENTS

| | | | |
|---|---|---|---|
| 7,844,354 B2 | 11/2010 | Keohane | |
| 8,244,103 B1 | 8/2012 | Shore | |
| 8,527,646 B2* | 9/2013 | Khatib | G06F 3/048 707/603 |
| 8,610,730 B1 | 12/2013 | Negulescu et al. | |
| 8,923,607 B1* | 12/2014 | Kwatra | G06K 9/00724 382/159 |
| 9,024,868 B2 | 5/2015 | Oka | |
| 9,027,064 B1* | 5/2015 | Opare-Abetia | H04N 21/238 725/115 |
| 9,077,956 B1* | 7/2015 | Morgan | H04N 9/8205 |
| 9,378,283 B2 | 6/2016 | Batraski | |
| 2001/0025375 A1* | 9/2001 | Ahmad | G06F 17/30787 725/39 |
| 2002/0112244 A1 | 8/2002 | Liou et al. | |
| 2004/0010687 A1 | 1/2004 | Futa | |
| 2005/0019015 A1 | 1/2005 | Ackley | |
| 2005/0091686 A1* | 4/2005 | Sezan | H04L 12/2805 725/46 |
| 2005/0193341 A1* | 9/2005 | Hayward | G11B 27/034 715/716 |
| 2005/0257152 A1 | 11/2005 | Shimizu | |
| 2006/0059504 A1 | 3/2006 | Gomez | |
| 2006/0272000 A1* | 11/2006 | Kwak et al. | 725/137 |
| 2006/0275028 A1 | 12/2006 | Lee | |
| 2007/0006262 A1* | 1/2007 | Cleron | H04N 7/17318 725/42 |
| 2007/0074269 A1 | 3/2007 | Hua | |
| 2007/0136750 A1 | 6/2007 | Abanami | |
| 2007/0245379 A1* | 10/2007 | Agnihortri | G06F 17/30796 725/46 |
| 2008/0036917 A1* | 2/2008 | Pascarella | G11B 27/11 348/702 |
| 2008/0136790 A1 | 6/2008 | Hio | |
| 2008/0155474 A1 | 6/2008 | Duhig | |
| 2008/0178230 A1* | 7/2008 | Eyal | H04N 21/8153 725/86 |
| 2008/0178234 A1* | 7/2008 | Eyal | H04N 21/8153 725/91 |
| 2008/0204465 A1 | 8/2008 | McGowan et al. | |
| 2008/0273804 A1 | 11/2008 | Malewski | |
| 2008/0301579 A1* | 12/2008 | Jonasson et al. | 715/803 |
| 2009/0094159 A1* | 4/2009 | Cunningham et al. | 705/51 |
| 2009/0110363 A1 | 4/2009 | Kim | |
| 2009/0172197 A1* | 7/2009 | Kalaboukis | G06F 17/30876 709/246 |
| 2009/0199251 A1* | 8/2009 | Badoiu et al. | 725/105 |
| 2009/0249421 A1 | 10/2009 | Liu | |
| 2010/0023984 A1* | 1/2010 | Davi | H04N 7/17318 725/110 |
| 2010/0070523 A1 | 3/2010 | Delgo | |
| 2010/0125875 A1* | 5/2010 | Hays | H04N 7/17318 725/61 |
| 2010/0186034 A1* | 7/2010 | Walker | H04N 21/4334 725/40 |
| 2010/0232518 A1 | 9/2010 | Coleman et al. | |
| 2010/0260468 A1 | 10/2010 | Khatib et al. | |
| 2011/0185392 A1* | 7/2011 | Walker | H04N 5/44543 725/82 |
| 2012/0014533 A1 | 1/2012 | Gough | |
| 2012/0017150 A1 | 1/2012 | Pollack | |
| 2012/0079529 A1 | 3/2012 | Harris et al. | |
| 2012/0099641 A1 | 4/2012 | Bekiares et al. | |
| 2012/0141095 A1 | 6/2012 | Schwesinger | |
| 2012/0173981 A1* | 7/2012 | Day | G06F 3/04817 715/719 |
| 2012/0201517 A1 | 8/2012 | Sakuragi et al. | |
| 2012/0278725 A1 | 11/2012 | Gordon | |
| 2012/0278764 A1 | 11/2012 | Arriola | |
| 2012/0290933 A1 | 11/2012 | Rajaraman | |
| 2012/0314943 A1 | 12/2012 | Guerrero et al. | |
| 2012/0323897 A1* | 12/2012 | Daher | G06F 17/30026 707/723 |
| 2012/0328265 A1 | 12/2012 | Sakuragi et al. | |
| 2013/0007198 A1 | 1/2013 | Gupta et al. | |
| 2013/0018960 A1 | 1/2013 | Knysz | |
| 2013/0024895 A1 | 1/2013 | Yong | |
| 2013/0031219 A1 | 1/2013 | Liu | |
| 2013/0042271 A1 | 2/2013 | Yellin | |
| 2013/0047084 A1 | 2/2013 | Sanders | |
| 2013/0097238 A1 | 4/2013 | Rogers | |
| 2013/0097550 A1 | 4/2013 | Grossman | |
| 2013/0129317 A1 | 5/2013 | Moorer | |
| 2013/0163963 A1 | 6/2013 | Crosland | |
| 2013/0174197 A1* | 7/2013 | Gunatilake | H04N 21/44008 725/38 |
| 2013/0317951 A1 | 11/2013 | Kuznetsov | |
| 2014/0104494 A1 | 4/2014 | Begeja et al. | |
| 2014/0130080 A1* | 5/2014 | Badoiu | G06F 17/30867 725/24 |
| 2014/0143725 A1 | 5/2014 | Lee | |
| 2014/0169766 A1 | 6/2014 | Yu et al. | |
| 2014/0219629 A1 | 8/2014 | McIntosh et al. | |
| 2014/0219634 A1 | 8/2014 | McIntosh et al. | |
| 2014/0219637 A1 | 8/2014 | McIntosh et al. | |
| 2014/0223306 A1 | 8/2014 | McIntosh et al. | |
| 2014/0223307 A1 | 8/2014 | McIntosh et al. | |
| 2014/0325568 A1* | 10/2014 | Hoang | H04N 21/235 725/61 |
| 2014/0359656 A1 | 12/2014 | Banica | |
| 2015/0138406 A1 | 5/2015 | Sokeila | |
| 2016/0064034 A1 | 3/2016 | McIntosh et al. | |
| 2016/0217826 A1 | 7/2016 | McIntosh et al. | |

OTHER PUBLICATIONS

Non-Final Rejection, dated Jul. 16, 2015, for U.S. Appl. No. 14/173,715, filed Feb. 5, 2014, 18 pages.
Notice of Allowance dated Sep. 11, 2015, in U.S. Appl. No. 14/173,740, 15 pages.
Non-Final Office Action dated Nov. 4, 2015, in U.S. Appl. No. 14/173,753, 36 pages.
Non-Final Rejection, dated Feb. 11, 2016, for U.S. Appl. No. 14/173,745, filed Feb. 5, 2014, 15 pages.
Final Office Action issued May 6, 2016, in U.S. Appl. No. 14/173,753, 35 pages.
Final Office Action issued Jul. 26, 2016, in U.S. Appl. No. 14/173,732, 15 pages.
Notice of Publication of Application issued Jul. 28, 2016, in U.S. Appl. No. 15/091,358.
Corrected Notice of Allowance issued Nov. 25, 2015, in U.S. Appl. No. 14/173,740, 2 pages.
Non-Final Office Action dated Dec. 17, 2015, for U.S. Appl. No. 14/173,732, 12 pages.
Notice of Allowance and Fees Due mailed Jan. 13, 2016, for U.S. Appl. No. 14/173,715, 5 pages.
Non-Final Rejection dated Sep. 23, 2016, for U.S. Appl. No. 14/937,557, 12 pages.

(56) References Cited

OTHER PUBLICATIONS

Notice of Allowance dated Sep. 21, 2016, in U.S. Appl. No. 14/173,745, 16 pages.

* cited by examiner

VIDEO PREVIEW CREATION WITH LINK

CROSS-REFERENCE TO RELATED APPLICATIONS

This application is a non-provisional application of U.S. Patent Application No. 61/761,096, filed on Feb. 5, 2013, U.S. Patent Application No. 61/822,105, filed on May 10, 2013, U.S. Patent Application No. 61/847,996, filed on Jul. 18, 2013, and U.S. Patent Application No. 61/905,772, filed on Nov. 18, 2013, which are herein incorporated by reference in their entirety for all purposes.

This application is related to commonly owned and concurrently filed U.S. patent application Ser. No. 14/173,715, entitled "User Interface for Video Preview Creation", U.S. patent application Ser. No. 14/173,732, entitled "Video Preview Creation based on Environment", U.S. patent application Ser. No. 14/173,740, entitled "Video Preview Creation with Audio", U.S. patent application Ser. No. 14/173,745, entitled "Generation of Layout of Videos", U.S. patent application Ser. No. 14/173,753, entitled "Activating a Video Based on Location in Screen", which are herein incorporated by reference in their entirety for all purposes.

BACKGROUND

Users commonly provide video content to websites (e.g., YouTube), which can be referred to as "posting a video." The user can spend a significant amount of time to convey the message of the video before the user selects the video (e.g., by clicking the video displayed on a website). For example, the user can associate a title, a static thumbnail image, and/or a textual description with the video. Users often have an difficult time when the video originates on a different website and the user tries to upload their video to a video server. Further, the title may not be descriptive of the contents of the video, the static thumbnail image may not summarize the essence of the video, or the description of the video may be a poor signal for whether the video will be interesting to a viewer.

Video browsing is also limited. Other users (e.g., viewers) can access and view the video content via the websites. For example, the viewers can see a video's title and static thumbnail of the video before deciding whether to play the full video. However, the viewers may find it difficult to select particular videos of interest because the title may not be descriptive of the contents of the video, the static thumbnail image may not summarize the essence of the video, or the textual description with the video may be a poor signal for whether the video will be interesting to the viewer. Thus, the viewers may spend significant amounts of time searching and watching videos that are not enjoyable to the viewer.

SUMMARY

Embodiments of the present invention can create and display portions of videos as video previews. The video previews may be associated with a full video, such that the video preview is generated from a portion of the full video. The video previews are configured to play a series of images associated with images from the portion of the full video when the video preview is activated (e.g., to convey the essence of the full video via a video preview).

Additionally, embodiments of the present invention provide a method for creating video previews based on sections of a full video that have been viewed more than once. For example, a series of images from the full video can be identified and associated with a video portion that has been played more than once, so that the video preview is generated from that identified portion. The video preview can be configured to play the video portion when the video preview is activated.

Other embodiments are directed to systems and computer readable media associated with methods described herein.

A better understanding of the nature and advantages of the present invention may be gained with reference to the following detailed description and the accompanying drawings.

DEFINITIONS

A "video preview" is a visual representation of a portion of a video (also referred to as a "full video" to contrast a "video preview" of the video). The full video may correspond to the entirety of a video file or a portion of the video file, e.g., when only a portion of the video file has been streamed to a user device. The preview is shorter than the full video, but the full video can be shorter than the complete video file. The preview can convey the essence of the full video. The video preview is shorter (e.g., fewer images, less time) than a full (e.g., more images, longer time, substantially complete) video. In various embodiments, a preview can be a continuous portion of the full video or include successive frames that are not continuous in the full video (e.g., two successive frames of the preview may actually be one or more seconds apart in the full video).

DETAILED DESCRIPTION

Embodiments of the present invention can enhance video viewing by providing short, instantly-playable video previews through a graphical user interface (GUI). Viewers can use the GUI of video previews to better decide whether to watch a full video, or channel of videos.

In one embodiment, the user may create a video preview that may later be accessed by a viewer. For example, the user may select the best 1-10 seconds of a video to convey the essence of the full video. The video preview can be shorter (e.g., fewer images, less time) than a full (e.g., more images, longer time, substantially complete) video. The system associated with the GUI may generate a smaller file to associate with the video portion (e.g., animated GIF, MP4, collection of frames, RIFF). The system may provide the GUI on a variety of systems. For example, the GUI can be provided via an internet browser or client applications (e.g., software configured to be executed on a device) configured to run on a variety of devices (e.g., mobile, tablet, set-top, television). In other examples, a Resource Interchange File Format (RIFF) format can be used as a container format for storing data (e.g., the video preview, the full video, frames/images) in chunks.

I. Providing Video Previews

Figure 1:
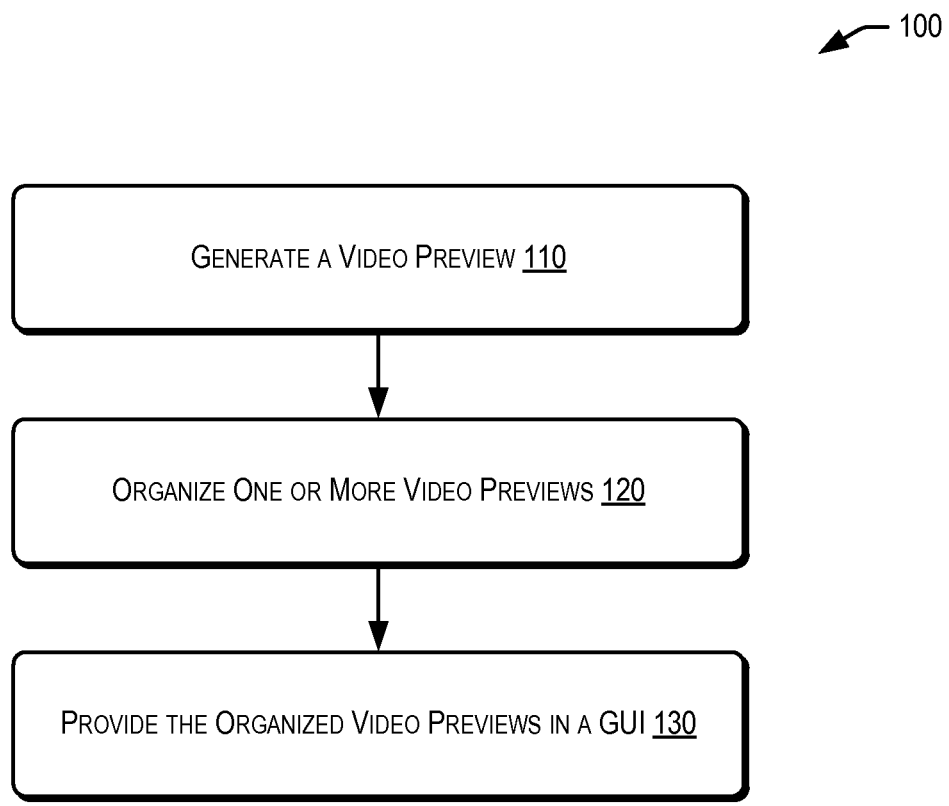
FIG. 1 shows a flowchart illustrating a method of creating a video preview, organizing the video previews, and providing a user interface that includes the video previews according to an embodiment of the present invention.

FIG. 1 shows a flowchart illustrating a method 100 of creating a video preview, organizing the video previews, and providing a user interface that includes the video previews according to an embodiment of the present invention. The method 100 may comprise a plurality of steps for implementing an embodiment of creating a video preview with a link. Various computing devices may be used to perform the steps of the method, including video servers, provider servers, user devices, or third party devices.

At step 110, a video preview may be generated. Embodiments of the invention may provide a graphical user interface for a user that allows the user to select a portion of a video (e.g., a full video) to use as a video preview. The system may generate the video preview based on the input received from the user. The input may be active (e.g., the user providing an identification of a video portion of a full video) or passive (e.g., a plurality of users view a section of the full video a threshold number of times, which identifies a video portion of a full video).

Additional means of generating video previews can be found in U.S. patent application Ser. No. 14/173,715, entitled "User Interface for Video Preview Creation", U.S. patent application Ser. No. 14/173,732, entitled "Video Preview Creation based on Environment", and U.S. patent application Ser. No. 14/173,740, entitled "Video Preview Creation with Audio" which are incorporated by reference in their entirety.

At step 120, one or more video previews may be organized into one or more channels or collections. For example, the method 100 can associate the video preview generated in step 110 (e.g., a 4-second animated GIF of a snowboarder jumping off a ledge) with a channel (e.g., a collection of videos about snowboarders). In some embodiments, the video previews may be organized in a group (e.g., a composite, a playable group, a cluster of video previews) and displayed on a network page. Additional information about the organization and layout of video previews can be found in U.S. patent application Ser. No. 14/173,745, entitled "Generation of Layout of Videos", which is incorporated by reference in its entirety.

At step 130, a GUI may be provided with the video previews. For example, the GUI may provide one or more channels (e.g., channel relating to snowboarders, channel relating to counter cultures), one or more videos within a channel (e.g., a first snowboarding video, a second snowboarding video, and a first counter culture video), or a network page displaying one or more video previews. The video previews may be shared through social networking pages, text messaging, or other means. Additional information about viewing and sharing video previews can be found in U.S. patent application Ser. No. 14/173,753, entitled "Activating a Video Based on Location in Screen", which is incorporated by reference in its entirety.

II. System for Providing Video Previews

Various systems and computing devices can be involved with various workflows used to create a video preview with a link (e.g., to a full video).

A. System for Generating Video Previews

Figure 2:
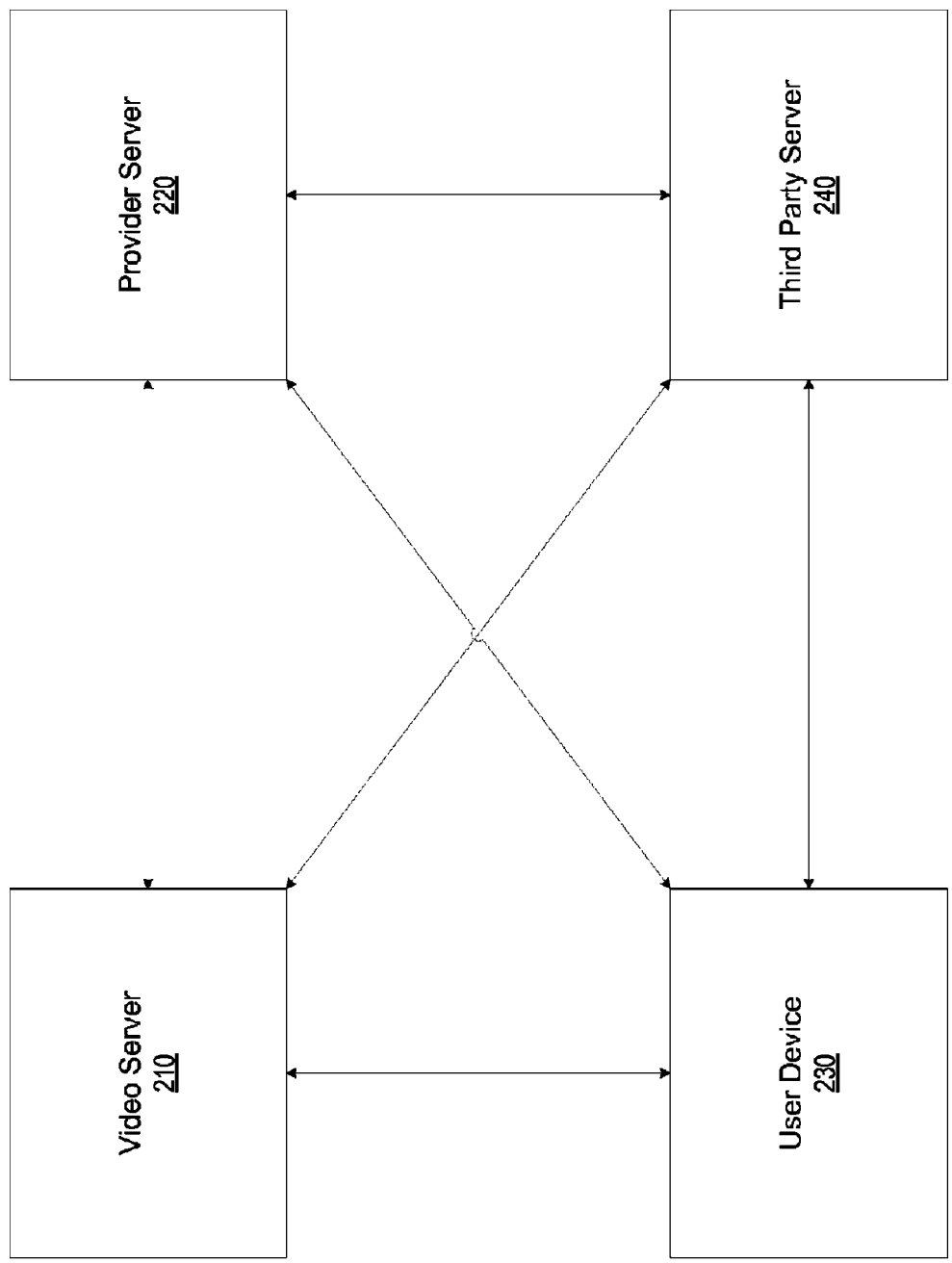
FIG. 2 shows block diagrams of various subsystems used to generate or provide a video preview.

FIG. 2 shows block diagrams of various computing devices used to generate or provide a video preview. For example, the computing devices can include a video server 210, a provider server 220, a user device 230, or a third party server 240 according to an embodiment of the present invention. In some embodiments, any or all of these servers, subsystems, or devices may be considered a computing device.

Computing devices may include a mobile phone, a smart phone, a personal digital assistant (PDA), a laptop computer, a desktop computer, a thin-client device, a tablet PC, server computer(s), or one or more virtual machines implemented in a hosted computing environment. In one illustrative configuration, the computing devices may include at least one memory and one or more processing units or processor(s). The processor(s) may be implemented as appropriate in hardware, computer-executable instructions, firmware, or combinations thereof. Computer-executable instruction or firmware implementations of the processor(s) may include computer-executable or machine-executable instructions written in any suitable programming language to perform the various functions described. The computing devices may also include geo-location devices (e.g., a global positioning system (GPS) device or the like) for providing and/or recording geographic location information associated with the computing devices.

The memory may store program instructions that are loadable and executable on the processor(s), as well as data generated during the execution of these programs. Depending on the configuration and type of computing device, the memory may be volatile (e.g., random access memory (RAM)) and/or non-volatile (e.g., read-only memory (ROM), flash memory). The computing device may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

In some embodiments, the video server 210 can provide, transmit, and store full videos and/or video previews (e.g., Ooyala®, Brightcove®, Vimeo®, YouTube®, CNN®, NFL®, Hulu®, Vevo®). In some embodiments, the video server 210 can be a video-sharing website on which users can upload, view, and share videos. The video server may display a wide variety of user-generated and third party-generated video content, including video clips, television clips, musical videos, and amateur content such as video blogging, short original videos, and educational videos. The video server 210 may include registered and/or unregistered user access to upload or view various full videos and/or video previews.

The provider server 220 can interact with the video server 210 to provide the video previews. In some embodiments, the provider server 220 can receive information to generate the video preview (e.g., the link to the full video, the full video file, an identification of a portion of a full video to use to generate the video preview, a push notification including the link to the full video). The provider server 220 may provide one or more software applications or hardware that users or third parties can use to identify portions of full videos to use to generate the video previews.

The user device 230 can receive a video preview and/or full video and transmit information (e.g., an identification of a video portion of the full video, a timestamp) to generate the video preview from the full video. In some embodiments, the user device 230 may also be used to view, browse, or store the generated video previews.

The third party server 240 can also receive a video preview and/or full video and transmit information (e.g., an identification of a video portion of the full video, a timestamp) to generate the video preview from the full video. In some embodiments, the third party server 240 may also be used to view or browse the generated video previews.

The video server 210, provider server 220, a user device 230, and third party server 240 may communicate via one or more networks. The networks may include any one or a combination of many different types of networks, such as cable networks, the Internet, wireless networks, cellular networks and other private and/or public networks. It is also noted that the described techniques may apply in other client/server arrangements (e.g., set-top boxes), as well as in non-client/server arrangements (e.g., locally stored applications).

In some embodiments, the video server 210, provider server 220, a user device 230, and third party server 240 can be used to create a video preview with a link (e.g., to a full video). For example, the computing device (e.g., a provider server 220) may receive an identification of a video portion of the full video that corresponds to a series of images from the full video. The identification of a video portion of the full video can include a particular time stamp, identification of a location in the full video (e.g., at minute 1:10 of a 3:00 minute video), or other identification.

In some embodiments, a link may be associated with electronic content, information, or files other than a full video. For example, the link may access an intermediate page, including a main page that includes more than one full video accessible from the page. As an illustration, the full video may be accessible through the uniform resource locator (URL) "www.mainwebpage.com/videos" and the link may direct the computing device to "www.mainwebpage.com." The user may be able to browse through the content using the computing device in order to access the full video. In some examples, the link may access information that does not include the full video. As an illustration, the video preview may show a pair of shoes that, when selected, can direct the computing device to a page to purchase the shoes in an ecommerce platform. As another illustration, the link may access a shared repository (e.g., data store) that access an electronic file not associated with a full video.

The video previews or full videos may be stored in a database (e.g., at the computing device). The database may include a copy of the video preview and any information associated with the video preview (e.g., tags, captions, run time, shares). The database may be searchable. The database may be key/value based, or defined in a table format.

B. System-Generated Video Previews Using Non-Sequential Images

The video portion can correspond with non-sequential images from the full video. For example, the user or third party may select the first 10 seconds of the video (e.g., showing a visual display of the title in the video), the middle 5 seconds (e.g., a person falling down on a snowboard), and another 10 seconds of the video (e.g., showing the person jumping off of a ramp on the snowboard). In some instances, these non-sequential images may correspond with the essence of the video that the user would like to portray in a video preview. In some embodiments, the non-sequential images may be frames from the full video that combine to form a video portion that corresponds to the full video.

C. System-Generated Video Previews Using a Locally-Stored Full Video

The computing device (e.g., a provider server 220, user device 230) may also be configured to generate a video preview from the full video. In some embodiments, the computing device can receive a link to a full video from a graphical user interface (GUI). The GUI may be stored locally on a computing device (e.g., user device 230) or accessed remotely by a user or a third party (e.g., on a provider server 220). The video preview may be generated on various computing devices, each of which may use a different process of generating the video preview without diverting from the essence of the invention. For example, the computing devices can include a personal computer or tablet computer. Also, the subsystems can access a network page, websites, GUIs, applications, or other software to generate the video preview.

D. User-Generated Video Preview at a Provider Server

In an embodiment, a video preview may be generated by a provider server 220 using an identification of a video portion of the full video at a user device 230. For example, the user device 230 may be a personal computer that accesses a web browser. The web browser can be used to direct the user to a website. The user can access a portion of the website that is used to generate the video previews by providing login credentials. In an embodiment, the login credentials can be saved through use of cookies or other software that recognizes the user when they browse to the website.

The user device 230 may include a software application to interact with the provider server 220, so that the provider server 220 generates the video preview and transmits the generated video preview to the user device 230. For example, the user device 230 may first access an "app store" or some provider of software applications. The user device 230 can receive an executable file, so that the user device 230 is enabled to generate video previews. After installation, the video server 210 can transmit a full video to the user device 230 at the software application, instead of transmitting the full video to a GUI displayed on a webpage. The user device 230 can activate the request button provided by the software application to identify the timestamp. The user device 230 can transmit the timestamp, reference to the full video, or other information (e.g., user device ID, IP address, cookies, start time, length of the desired video preview) to the provider server. The provider server 220 may request and receive a full video. The provider server 220 can then provide the video preview to the user device 230 via the software application.

E. User-Generated Video Preview at a User Device

In some embodiments, the user device 230 can generate a video preview locally (e.g., using a software application or "app"). The user device 230 may first access an "app store" or some provider of software applications. The user device 230 can receive an executable file, so that the user device 230 is enabled to generate video previews. After installation, the software application on the user device can communicate with the video server 210 to receive a full video at the user device 230. The user device 230 may activate a request button provided by the software application to generate a timestamp, a start time, and/or length of the desired video preview. The software application can use the full video (e.g., MP4 file, stream, full video portion) to generate the video preview (e.g., by transcoding the full video, by using a portion of the encoded full video).

The user device 230 can transmit the generated video preview to the provider server 220. The provider server 220 can store a backup of the video preview and/or help the user device distribute the generated video preview (e.g., via social networking, using a distributed database).

In some embodiments, the video preview (e.g., file, animated GIF, link to a video preview) may be stored in a temporary location on a user device 230 (e.g., clipboard, temporary data buffer) or at another location associated with the user device 230 (e.g., cache, removable storage device) determined by the software application after the video preview is generated. The user may copy/paste the video preview to an email client, SMS, or other application in order to use or share the video with other applications and/or devices.

In some embodiments, the user device 230 generates the full video independent of the video server 210. The user device 230 can transmit the full video to the provider server 220, instead of transmitting a reference to the full video. The provider server 220 can generate the video preview (e.g., via transcoding) and provide the video preview to the user device 230. In some embodiments, the user device 230 can upload the video preview to the video server 210.

The full video may or may not be stored on the server. In an embodiment, the full video may be provided to the user by linking the user with the full video stored at its original location (e.g., by services provided by Hulu®, Netflix®, iTunes®).

F. User-Generated Video Preview at a Video Server

In some embodiments, the video server 210 may generate the full video and/or video preview without diverting from the essence of the disclosure.

G. Third-Party Generated Video Preview

A video preview may be generated by a provider server 220 using an identification of a video portion of the full video at a third party server 240 (e.g., instead of a user device 230). For example, the third party server 240 may be a personal computer that accesses a web browser. The web browser can be used to direct the third party to a website. The third party can access a portion of the website that is used to generate the video previews by providing login credentials. In an embodiment, the login credentials can be saved through use of cookies or other software that recognizes the third party when they browse to the website.

Several embodiments are possible. In some examples, the third party server 240 may include a software application to interact with the provider server 220. The video server 210 can transmit a full video to the third party server 240 via the software provided through provider server 220. The third party server 240 can identify a video portion of the full video (e.g., by activating a request button provided by the software on the provider server 220, by indicating a start time and end time via a GUI). The provider server 220 can use the identified video portion, reference to the full video, or other information (e.g., user device ID, IP address, cookies, start time, length of the desired video preview) to generate the video preview. The provider server 220 can transmit the generated video preview to a shared repository (e.g., website, database) or directly to a user device 230 or third party server 240. In some examples, the provider server 220 will distribute the video preview in order for users to receive a link to content (e.g., a full video, a website, online content) provided by the third party server 240.

In some embodiments, the third party server can generate multiple video previews related to the same full video (e.g., to test the receptiveness users have to the video preview). For example, the third party server 240 can identify a video portion of the full video (e.g., by indicating a start time and end time via a GUI). The provider server 220 can use the identified video portion, reference to the full video, or other information (e.g., user device ID, IP address, cookies, start time, length of the desired video preview) to generate the video preview. The provider server 220 can transmit the generated video preview to a shared repository (e.g., website, database). When users access the shared repository, the third party server 240 can collect information about the video previews (e.g., count the number of times each video preview is activated or selected, determine how long users watch the video preview after activating it). The third party server 240 may determine which video preview is more popular with users to get the users to select the video preview and access the link (e.g., to the full video, to information associated with the video preview).

H. User-Provided Full Videos

In an embodiment, a full video may be provided to the video server 210 from a user device 230. For example, the user can operate a device (e.g., video camera) to capture a series of images and temporarily store the images on the user device 230. The user can upload the video to the video server 210 or provider server 220. For example, the video server 210 may provide a GUI or other tools to accept a title, description, caption, or other information to help identify the video. In other examples, the provider server 220 can provide a GUI or other tools to accept the same information (e.g., title, description, caption) and transmit the full video to the video server 210 or data store maintained by the video server.

Once received, the video server 210 can manage the full video to make the full video accessible for other users. For example, the video server 210 may post the video to a network page and associate the corresponding information (e.g., title, description, caption) with the full video. The uploaded video can be a full video used to generate a video preview. For example, once the user uploads the full video to the video server 210, the user can identify a video portion of the full video, corresponding to a series of images from the full video, to help capture the essence of the full video.

III. Creation of a Video Preview

Various methods may be implemented to create the video preview.

A. Creating a Video Preview Using a Link to a Full Video

Figure 3:
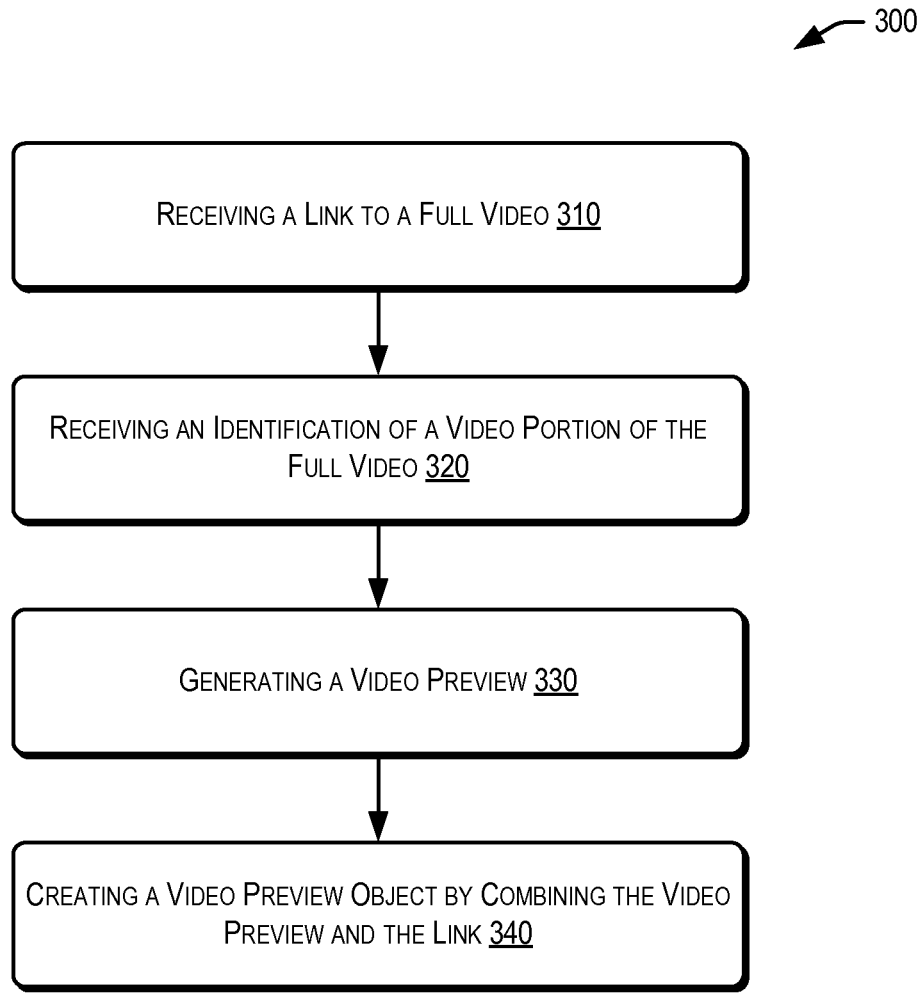
FIG. 3 shows a flowchart illustrating a method of generating a video preview according to an embodiment of the present invention.

FIG. 3 shows a flowchart illustrating a method of generating a video preview according to an embodiment of the present invention. In some embodiments, a video may begin as a series of frames or images (e.g., raw format) that are encoded by the video server 210 into a full video. The full video may reduce the size of the corresponding file and enable a more efficient transmission of the full video to other devices (e.g., provider server 220, user device 230). In some embodiments, the provider server 220 can transcode the full video (e.g., change the encoding for full video to a different encoding, encoding the full video to the same encoding or re-encoding) in order to generate and transmit the video preview. For example, transcoding may change the start time of a video, duration, or caption information.

The video server 210 may store and provide a full video. The full video can be received from a user or generated by the computing device and offered to users through a network page. In some embodiments, another computing device (e.g., a user device 230, a third party server 240) can upload the full video to the video server 210.

At block 310, a link to a full video may be received by a computing device. For example, the video server 210 may transmit a full video to a user device 230 through a GUI. The GUI can be configured to provide the user with the ability to indicate a video portion of a full video (e.g., a request button that allows the user device 230 to indicate a timestamp in the video preview). The user device 230 may identify a video portion of the full video by identifying a start/end time or other identification provided by the GUI. The start/end of the full video identified by the third party server 240 or user device 230 can be transmitted to the provider server 220 to generate the video preview. For example, the user device 230 may select the start time and end time of the full video provided by the video server 210 using a button on the GUI. In another example, the user device 230 may activate a button provided locally at the user device (e.g., via a software application, "app") and identify a start time and end time of the full video at the user device 230.

In some embodiments, the link to the full video can be included in a push notification. A push notification may be a message transmitted to a computing device (e.g., a provider server 220) that includes a request to generate a video preview. The push notification can include the link to the full video, the request to generate the full video, an identification of the full video or video portion to use to create the video preview, or other information.

At block 320, an identification of a video portion of a full video can be received by a computing device. For example, the identification of the video portion may be a message from the user device 230 to the provider server 220 that identifies a start/end time of the full video. In some embodiments, the user device 230 may generate a webserver request. The webserver request can include a litany of information for the webserver, including a start/end time, link to a full video at the video server 210, timestamp, the user's internet protocol (IP) address, a user-agent string of the browser, cookies, a user's user identifier (ID), and other information. A user-agent string, for example, may include information about a user device 230 in order for the webserver to choose or limit content based on the known capabilities of a particular version of the user device 230 (e.g., client software). The provider server 220 can receive this and other information from the user device 230.

The provider server 220 may request a full video based in part on the information received from the user device 230. For example, the provider server 220 can transmit a request (e.g., email, file, message) to the video server 210 that references the full video (e.g., link, identifier) referenced by the user device 230. In some examples, the video server 210 and provider server 220 may be connected through a direct and/or secure connection in order to retrieve the video (e.g., MP4 file, stream, full video portion). The video server 210 may transmit the full video (e.g., file, link) to the provider server 220 in response to the request or link to the full video.

In some embodiments, the request may vary depending on the type video needed for the full video or requested video preview. For example, the full video may be a raw MP4 format (e.g., compressed using advanced audio coding (AAC) encoding, Apple Lossless format). The provider server 220 can determine that the desired format for the user device 230 is a different type of file format (e.g., an animated GIF) and request additional information from the video server 210 in order to transcode the MP4 format to an animated GIF format for the user device 230 (e.g., including the device type, application that will play the video preview, etc.).

At block 330, a video preview can be generated. For example, the provider server 220 receives the full video and may generate the video preview in a variety of ways, including using encoding, transcoding, re-encoding, or generating a lossless copy of the video.

In some embodiments, the provider server 220 may generate the video preview through the use of keyframes (e.g., i-frames). For example, the provider server 220 can generate a video preview by transcoding the image data to the first keyframe. After the first keyframe, the provider server 220 can generate a lossless copy of the data starting at a particular start time and ending at a particular end time (e.g., based on a timestamp, based on a predetermined duration (e.g., predetermined length of time), based on particular information displayed in the image data). In some processes, the method may ensure the final product is correctly encoded without sacrificing significant processing time by transcoding the entire video.

At block 340, a video preview object can be created. For example, the video preview object can be created by combining the video preview and the link. In some embodiments, the provider server 220 creates the video preview object as a graphical, software-based object that is configured to play a series of images associated with images of the video portion from the full video when activated.

The provider server 220 can provide the video preview object to the user device 230. The video preview object may be provided using various methods. For example, the video preview can be transmitted as a video preview object via a messaging service to the user device 230, as a video preview object in an attachment to an email, embedded in an SMS or text message, provided through a GUI accessible by the user device, or other methods. In some embodiments, the video preview (e.g., file, animated GIF, link to a video preview) may be stored in a temporary location (e.g., clipboard, temporary data buffer) at a user device 230 after the video preview object is generated. The user may copy/paste the video preview object to an email client, SMS, or other application in order to use or share the video with other applications and/or devices.

The video preview can be provided to the user device 230 in a variety of formats through the use of a video preview object. For example, the video preview object can be provided as a link to a stored file on a webserver and/or the provider server 220, an animated GIF file, an MP4 file, or other acceptable file format. In some examples, the video preview object can be provided in a format based in part on a particular type of user device 230 (e.g. Apple iPhones can receive a MPEG-4 formatted file, Android machines can receive an AVI formatted file). The user device 230 may provide information (e.g., device type, operating system) to the provider server 220 prior to receiving the properly formatted video preview.

In some embodiments, the provider server 220 may provide a GUI that allows the user device to access one or more social networking platforms (e.g., Facebook®, Twitter®, Google+®, Tumblr®) so that the video preview can be uploaded directly to the social networking website.

In some embodiments, the video server 210, instead of a provider server 220, provides the video preview to the user device 230. For example, the provider server 220 can receive the full video (e.g., in response to a user request, in response to a push notification). The provider server 220 can generate the video preview from the full video (e.g., based on user input) and provide the video preview to the video server 210. The video server 210 can provide the video preview to a user device 230.

The video server 210 may provide the video preview in various formats. For example, the video server 210 can provide the video preview as an additional link stored with the video server (e.g., when the video preview is uploaded to the video server 210 from the provider server 220). In another example, the video preview can be transmitted as a link to the full video with instructions. The instructions can identify for a web browser, software application, or user device which portion of the full video to play and/or repeat for the video preview. In yet another example, the video preview may be provided as an attachment to a message, provided through a GUI accessible by the user device, or other methods. In another example, the video server 210 can store the generated video preview at the video server 210 and provide the video preview (or link to the video preview) to the user device 230 as a pre-encoded video preview from the provider server 220.

B. Creating a Video Preview Using Feedback

Embodiments of the present invention can analyze the behavior from one or more viewers to automatically generate video previews. For example, a method can determine which sections of a full video that viewers are watching and generate a video preview based on that section.

Figure 4:
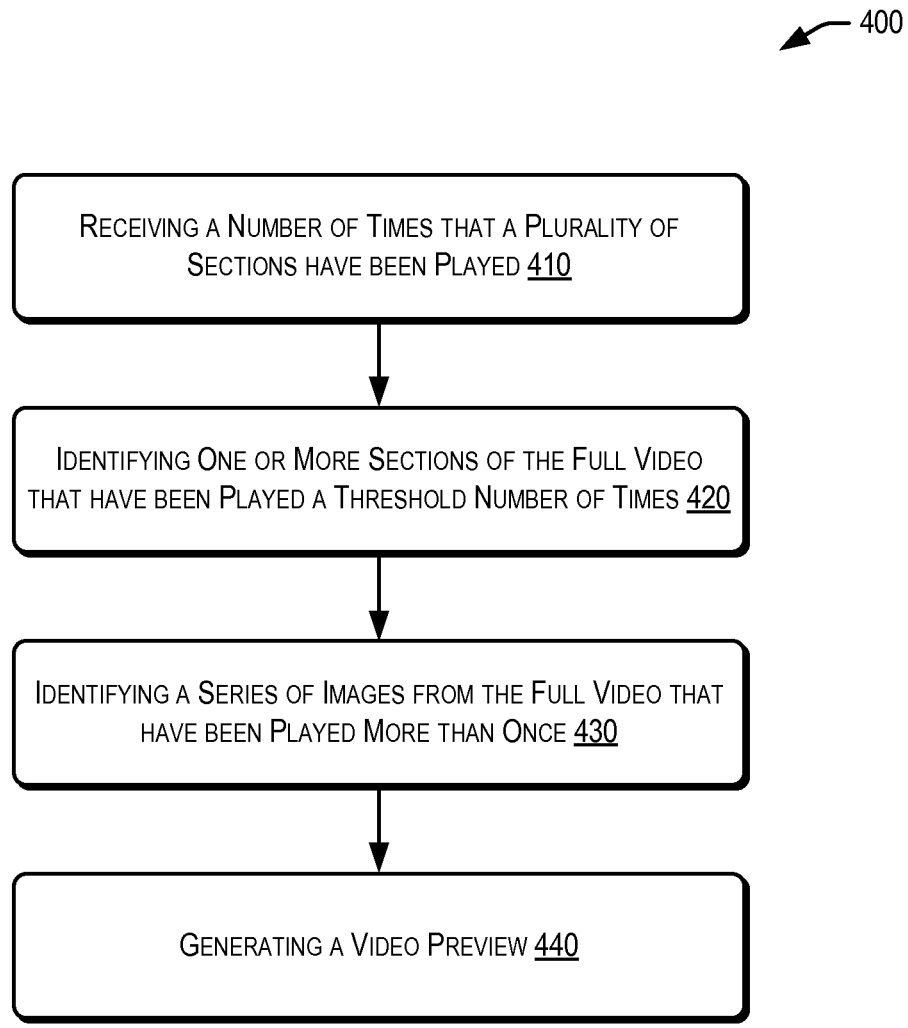
FIG. 4 shows a flowchart illustrating a method of generating a video preview according to an embodiment of the present invention.

FIG. 4 shows a flowchart illustrating a method of generating a video preview according to an embodiment of the present invention. In some embodiments, a computing device can receive a full video. For example, a computing device (e.g., provider server 220) can receive a link to a full video from a GUI. In some embodiments, the computing device may receive the full video, a video portion corresponding to a series of images of the full video, or the video preview.

At block 410, the computing device receives a number of times that a plurality of sections have been played. For example, for each of a plurality of sections of the full video, the computing device can receive a number of times that the section of the video has been viewed by a plurality of viewers. The computing device can track the number of times a frame, images, or plurality of frames/images of the video viewers watch the most.

In an embodiment, one or more users can play a full video, which can activate a process at the computing device. The computing device can track which portions of the video viewers watch the most. For example, if the full video is a minute long and 10 percent of all viewers rewind the video to replay a video portion between seconds 32 and 37, the computing device can generate a video preview of the portion of the video between 32 and 37 seconds. This may help generate feedback (e.g., crowd sourcing) from the viewers about the best parts of the full video to use for a video preview.

In an embodiment, only a subset of viewers may be considered to determine which portion of the video should be used to generate a video preview. For example, if 15% of the viewers watch the entire video, those viewers can be considered as a sample selection of viewers that the process analyzes. The portion of the video that the 15% of viewers rewind can be the portion of the video that is used to generate the video preview, so that the full video replays the video portion more than once.

In an embodiment, multiple video previews can be generated by analyzing different sets of viewers. For example, one set of viewers may only watch 1 minute of the video and like the first 5 seconds of the video, while another sample of viewers watch an entire 3 minute video and like minutes 1:35-1:40. The computing device may determine "liking" a portion of a video when the video is rewound to that portion and replayed. Video previews can be generated based on each set of viewers.

At block 420, one or more sections of the full video may be identified that have been played a threshold number of times. In an embodiment, the computing device can identify (e.g., count) the number of times a portion of the full video is played and compare it to a threshold. For example, a threshold number of times may be at least double the number of times that other sections are viewed, so that the plurality of users view the particular section of the full video at least twice as often as other sections of the full video. Any threshold number of times may be correlated with the threshold without diverting from the essence of the embodiment.

At block 430, a series of images can be identified from the full video that have been played more than once. In some examples, once the threshold number of times the video portion has been played, the computing device can generate a notification that the threshold has been reached and identify the series associated with the threshold.

At block 440, a video preview can be generated. For example, the computing device can transcode the full video (e.g., change the encoding for full video to a different encoding, encoding the full video to the same encoding or re-encoding) in order to generate the video preview. In an embodiment, the computing device can combine multiple sections of the video to create the video preview, including the sections of the full video that have been played a threshold number of times (e.g., 25% more than the rest of the video). Different sections of the video preview can be combined to create a single video preview.

In some embodiments, the video preview can be transmitted (e.g., to a user device). For example, the method may first transmit the video preview to the client once the video preview has been created. The method may send a request to the user device to confirm that the video preview is acceptable, and receive a response from the user device. When the response indicates that the video preview is acceptable, the method may send a message to a second computing device that includes the video preview and a link to the full video. In some examples, the link to the full video can be generated and shared by pasting the link in a message transmitted by the device via a network. In some examples, the GUI can activate an email application. The GUI may also initiate a draft email addressed to an arbitrary number of the user's contacts and place the video preview as contents of the email. The user can add text to the email, as necessary. In some examples, the messages application may be opened externally to the video preview generation application (e.g., in an iOS operating system, in environments that support pasting the slice into an iMessage or MMS). The GUI may not automatically address the contacts in one or more environments, which may leave the user to manually input the contact addresses and/or incorporate a process for adding addresses outside of the GUI application.

In some embodiments, reports or summaries may be generated with the information to help analyze the viewers' behaviors (e.g., histograms).

C. GUI for Video Previews with a Linked File

Embodiments can provide a graphical user interface where users can specify a range in time for a given full video that represents a portion of the video to create a video preview. For example, the user may specify a 5-second portion of a demolition video that shows when the building falls to the ground. This 5-second portion may represent the best animated moment of the full video or the essence of the full video. Users specify the link to the video or upload the file and are provided an interface to preview and select a range of video that best represents the full video or channel of videos.

Figure 5:
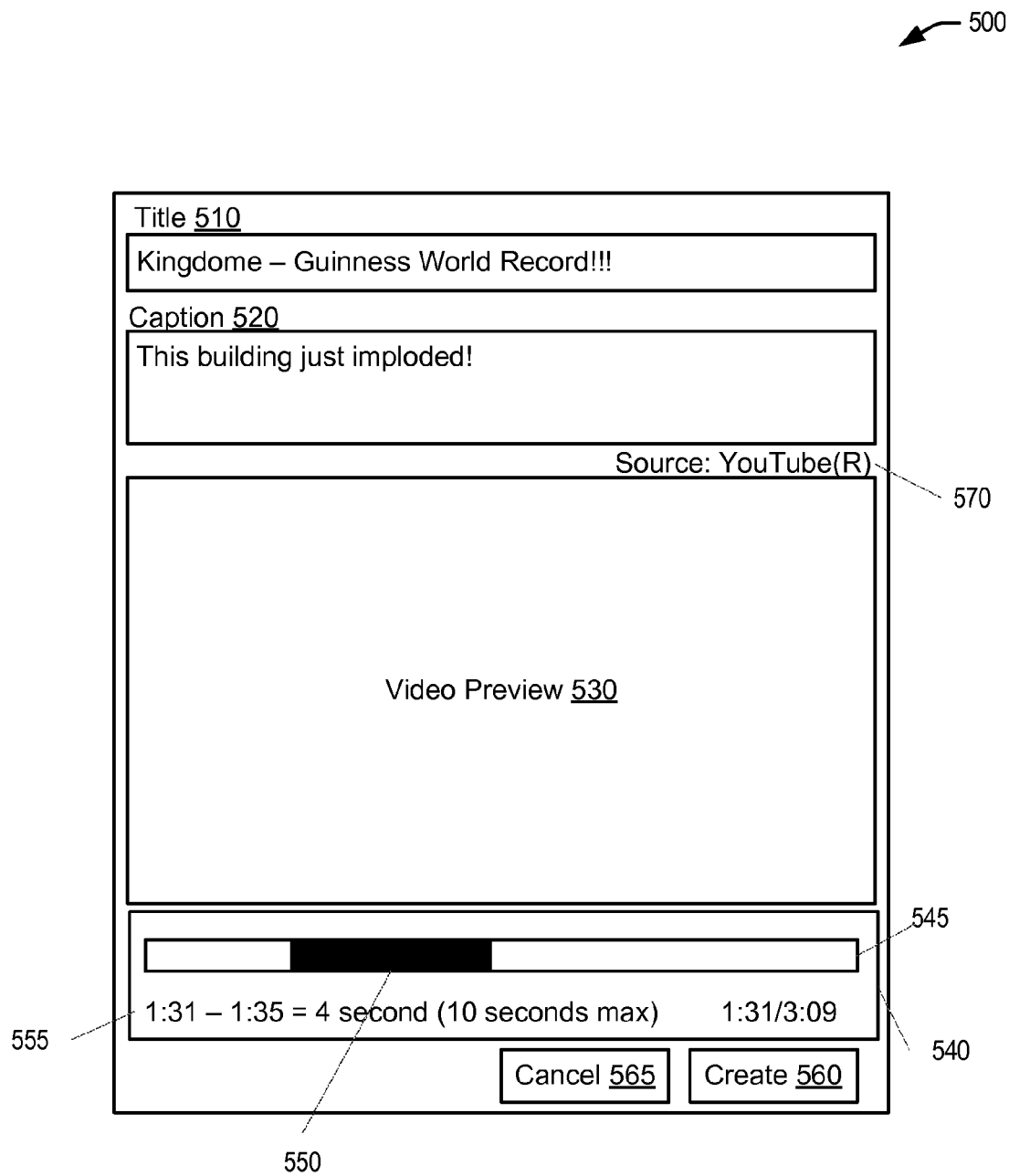
FIG. 5 shows a graphical user interface that allows a user to generate a video portion according to an embodiment of the present invention.

FIG. 5 shows a graphical user interface (GUI) that allows a user to generate a video portion according to an embodiment of the present invention. The GUI 500 can comprise a title area 510, caption area 520, video area 530, and video selection portion 540. The video selection portion 540 can include a scroll bar 545, an indicator 550, a text area displaying the amount of time associated with the selected video 555, a create button 560, and a cancel button 565. The GUI may also display the origin of the video 570.

The user may provide a title for the video in the title area 510. The user may generate the title, which can eventually be displayed to a viewer, and can summarize the contents of the full video and/or the associated video preview.

The user may also provide a caption for the video in the caption area 520. The caption may be displayed to a viewer (e.g., in addition to the title) and can summarize the contents of the full video and/or the associated video preview.

The user may provide a path or link to a video. In one embodiment, users provide a link to the video content. Video content can be retrieved from the link and displayed in the video area 530. For example, the video area 530 can display the complete video or the video preview. In an embodiment, the path to a video may be to a source at a client computer (e.g., C:\ drive), at an external source like a website, or at a video server 210.

In an embodiment, the video may be captured using a GUI that also display the video. For instance, a user could create a 5-minute video while watching Netflix® or HBO GO® in his or her browser. The 5-minute video may not necessarily link to the hosted content (e.g., at the video server 210) and instead link to a location of where the newly created 5-minute video is stored (e.g., at the user device 230).

In an embodiment, the user may select multiple videos to incorporate into one or more video previews. For example, the user can include "snippets" or small portions of one or more full videos to generate a video preview (e.g., one video portion from one television show and one video portion from another television show, or a combination of video portions to showcase a particular actor in many roles). For example, one snippet can be taken from the video of one episode of the show and another snippet can be taken from a different episode of the show. As another example, one snippet can be taken from one show on a first channel and another snippet can be taken from a different show on the first channel.

In an embodiment, the user may provide the video preview. For example, the video preview may be provided without capturing a portion of a full video. The user may provide the video preview to the GUI and the video preview may be displayed in the GUI.

Once a path or link to the video has been provided (e.g., link to a video on a video server 210, path to a captured video using the GUI), the user may select the range of image frames from the video or a range of time from the video to use as a video preview, using the video selection portion 540. In some embodiments, the user can select a range of time in the video (e.g., 10 seconds). In other embodiments, individual frames could be listed and a user could select a certain number of frames (e.g., 1-10) or select the individual frames (e.g., frames 0, 2, 5, 10, 15, and 20). The range can be stored as a set of images in any relevant image format (e.g., GIF, JPG). The set of images can be placed adjacent to each other (e.g., strung together) in a video file. This may create a video portion. It can be advantageous to store the images in an image format, because the video preview can load the video preview much faster than a standard video format (e.g., AVI, WMV) when the viewer later activates the video preview (e.g., when the video preview is in the middle of a screen on a device and playing instantly) or selects the video preview (e.g., when the video preview was activated and began playing, and then the viewer has double-tapped the location of the video preview to initiate the complete video).

The video portion 540 may also include a scroll bar 545. The scroll bar may be a representation of the video in terms of time. For example, the length of the scroll bar can represent 4 minutes, which could be the entire length of the video. If the indicator 550 is in the middle of the scroll bar, the position of the video may be at 2 minutes, or in the middle of the video.

Non-consecutive frames can be chosen as well. For example, a user can select several clips of a video that would play consecutively. In one embodiment, the GUI can contain a draggable "gripper" that enables the user to select a precise number of sections to use for the video preview. Multiple grippers could be added to the video timeline and numbered. Additionally, an uploading interface could enable users to upload individual scenes of videos (e.g., scenes the user made, frames or images found on external websites) and splice the scenes together to create a video preview with non-consecutive frames.

The video portion 540 may also include a text area displaying the amount of time associated with the selected video 555. For example, the text area may show the particular position of the video that was used to generate the video portion (e.g., the 3-minute video at 1 minute 31 seconds through 1 minute 35 seconds was used to make the video portion) and how much of the video has been used to create the video portion (e.g. 4 seconds). The text area displaying the amount of time associated with the selected video 555 may also notify the user of any limitations associated with generating a video preview (e.g., only 10 seconds of the video may be used for the video preview).

Additionally, the user can specify a number of frames per second to sample the video by, so that a short preview can cover a much longer section of the video. For instance, 60 seconds of the video could be conveyed in 10 seconds by selecting only a fraction of the original frames. The GUI may display the altered frame rate (not shown).

In some embodiments, the user or third party may specify a number of frames per second (e.g., via the GUI, in a request external to the GUI, identified in a profile specifying a default number of frames per second for video previews). The frame rate for the video preview can be a frame rate less than the frame rate in the full video (e.g., 10 frames per second vs. 15 frames per second) or the same frame rate as the frame rate in the full video. In some embodiments, the computing device can receive the specified number of frames per second and generate the video preview based on the specified information. The video preview can be generated at an altered frame rate associated with the specified number of frames per second.

The video portion 540 may also include a create button 560 and a cancel button 565. For example, once the user has selected the frames or time to use for the video portion, the user can select the create button 560 to create a video preview or the cancel button 565 to not create a video preview.

The GUI 500 may also display the origin of the video 570. For example, if the user provided a link to a video in YouTube®, the GUI may display the origin of the video in the GUI.

The video portion may be uploaded to a computing device. In an embodiment, the video portion may be uploaded to the computing device directly (e.g., without a full video uploaded as well). The video portion can be combined with other previews and associated with the full video at another time. A video portion may also be created from a full (e.g., longer, complete, original) video. The full video can be retrieved from the original source and stored on the computing device so that the appropriate section of the full video can be selected and converted into individual frames (e.g. GIF format) or a specific type of video format (e.g. WMV or MP4 format). In an embodiment, a group of images or a full encoded video file (such as an MP4 file) could be uploaded to the computing device. The video preview can be stored on the computing device or on an external hosting service.

Figure 6:
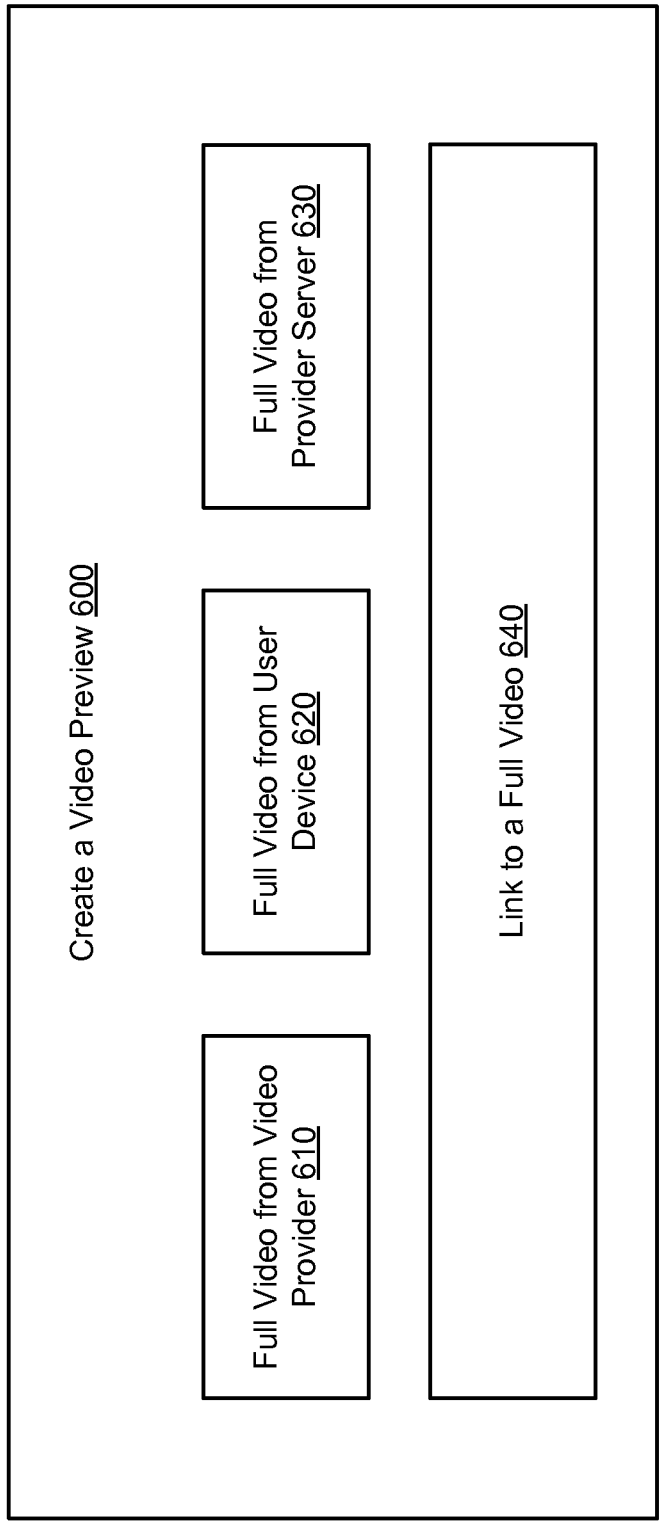
FIG. 6 shows a graphical user interface that may be used to generate a video preview according to an embodiment of the present invention.

FIG. 6 shows a graphical user interface (GUI) that may be used to generate a video preview according to an embodiment of the present invention. The GUI 600 can include one or more options to start the process of creating a video preview. For example, the GUI can include a mechanism (e.g., button, text box, browsing tool) to access a full video provided by a video provider 610, a mechanism to access a full video provided by a user device 620, a mechanism to access a full video provided by a provider server or user profile 630, and a mechanism to provide a link to the full video 640.

In some embodiments, the mechanisms may be a button. For example, the user may select a button on a webpage to create a new video preview. Once the user selects (e.g., clicks) the button, the user create a new video preview from an existing full video (e.g., provided by a video server), upload an existing video preview (e.g., provided by a user device), or use a previously created video preview saved to the user's queue (e.g., provided by a provider server).

In some embodiments, the mechanisms may be a text box. For example, the user may type or browse to a uniform resource locator (URL) where the full video is located. Once the user types, selects, or browses to the URL, the URL (e.g., link) can be displayed in the text box. In some examples, the user may press a button to browse to the URL. When the user accesses the URL, the text box (e.g., 640) may be automatically populated with the URL. In other examples, the user can be prompted to enter a URL from an external website (e.g., YouTube®).

When the user specifies a URL, a progress bar may be displayed (not shown). The progress bar can show the progress the computing device has made in fetching and/or downloading the video for editing. In an embodiment, the progress bar may be displayed when the user is uploading, editing, and/or saving the video preview.

Figure 7:
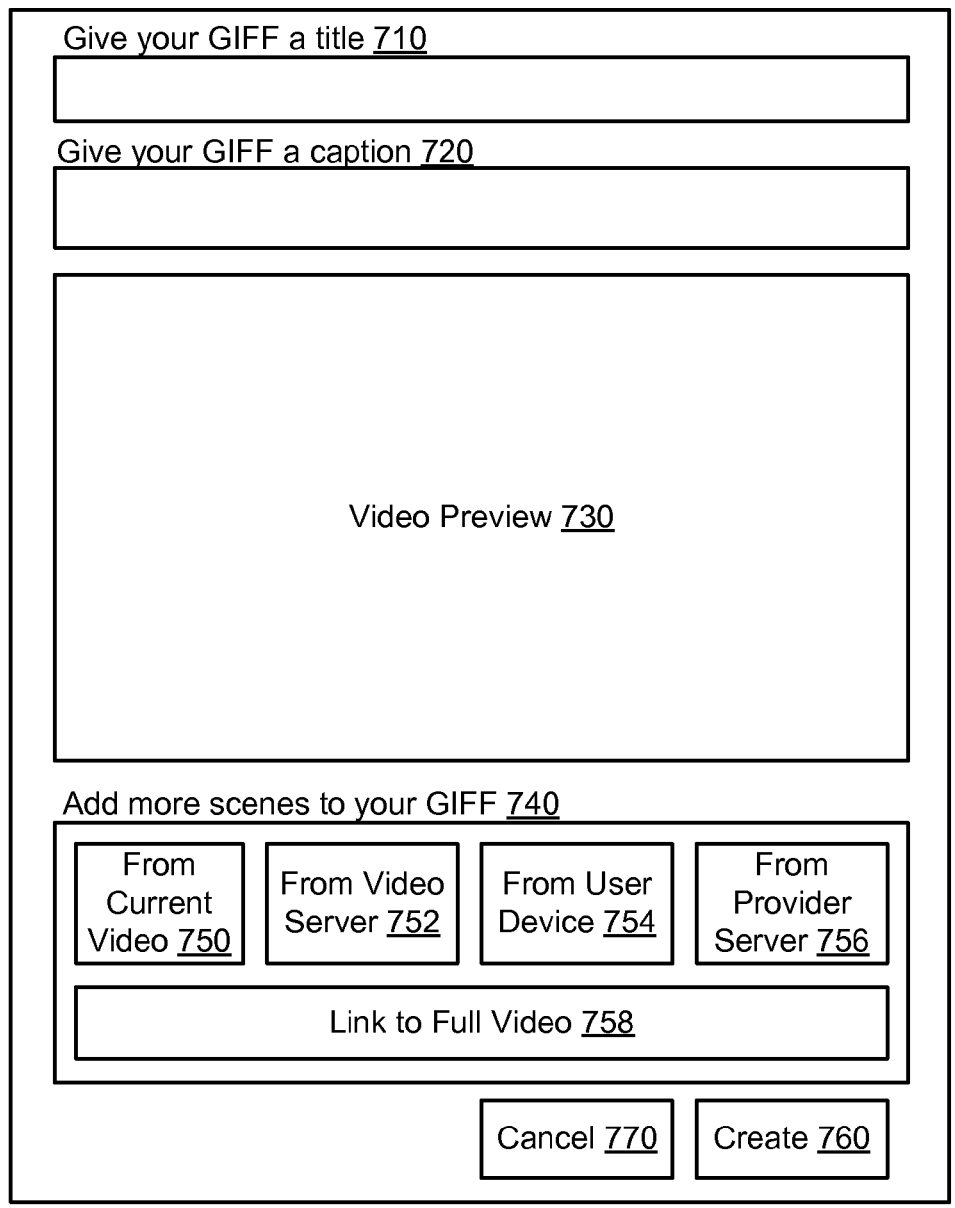
FIG. 7 shows a graphical user interface that may be used to generate a video preview according to an embodiment of the present invention.

FIG. 7 shows a GUI 700 that may be used to generate a video preview according to an embodiment of the present invention. The GUI 700 can include the text box 710 for the user to provide a title, a text box 720 for the user to provide a caption, a video preview 730, one or more mechanisms to alter the video preview 740, a create button 760, and a cancel button 770. These mechanisms to alter the video preview 740 can include adding one or more images from the current video 750, adding one or more images from a video provided by a video server 752, adding one or more images from a video provided by a user device 754, adding one or more images from a video provided by a provider server 756, or adding one or more images from a link to a full video 758 located at another location, accessible by a URL.

The user may use any of the mechanisms 740 to access images to add to the video preview. For example, the user can select various sources of images to add to a video preview. The GUI may be used to add more scenes to the video preview or used to adjust the layout of the video associated with the GUI. In one embodiment users can splice multiple scenes from a single video or several different videos together to create a single continuously playing preview. This enables creators to better visualize and convey elaborate concepts in their video preview.

In one example, the user may select the mechanism (e.g., button) associated with adding images from a video server 750. The selection may open a GUI, like the GUI illustrated in FIG. 5. The user can select one or more images, video portions, or blocks of time to add to the video preview. The video preview 740 can be updated with the new images. The GUI 700 may accept identifications of where the new images should be placed as well.

The user may also choose to add images from a link to a different full video as well. In an embodiment, the user may choose to add images from a link to a full video provided by a video server 752. The GUI 700 can access the video server 210 (e.g., through an application that accesses a webpage provided by the video server, through a direct connection to a data store managed by the video server). The user may choose the full video at the video server and the GUI 700 can receive the link to the full video (e.g., operated by the computing device).

The user may choose to add images from a link to a full video provided by a user device 754. The GUI 700 can access the user device 230 (e.g., through an application that accesses a webpage provided by the video server, through a direct connection to a data store, through a local drive identified by the user (C:\)). The user may choose the full video at the user device and the GUI 700 can receive the link to the full video.

The user may choose to add images from a link to a full video provided by a provider server 756. The GUI 700 can access the provider server 220 (e.g., through an application that accesses a webpage provided by the video server, through a direct connection to a data store associated with the provider server). The user may choose the full video at the provider server and the GUI 700 can receive the link to the full video.

In some embodiments, the portion of the GUI that accepts a link to the full video 758 may accept a URL or other identification of the location of the full video. The link can be accessed by the computing device, or received through the GUI, once the user provides the URL.

D. Capturing a Video Preview from a Streaming Video

Figure 8:
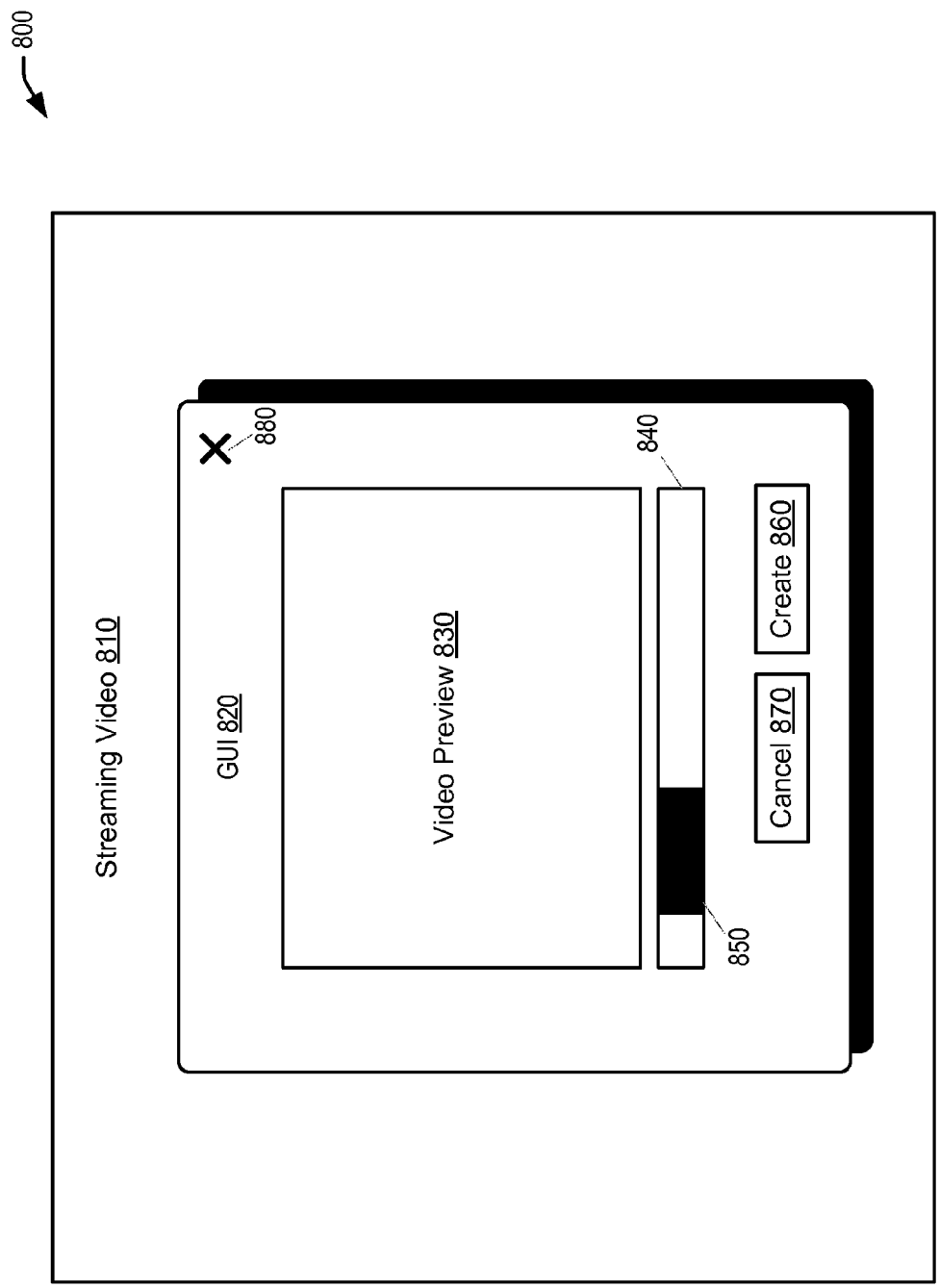
FIG. 8 shows a graphical user interface that may be used to capture a video preview from a streaming video according to an embodiment of the present invention.

FIG. 8 shows a graphical user interface that may be used to capture a video preview from a streaming video according to an embodiment of the present invention. For example, the GUI 800 can show a streaming full video 810 or a screenshot of a portion of a webpage before the portion of the webpage is captured using the webpage add-on according to an embodiment of the present invention.

The GUI 800 may also include a second GUI 820. The second GUI 820 can overlay on the first GUI 800 that displays the streaming video 810. The second GUI 820 can include the video preview 830, scroll bar 840, indicator 850, create button 860, cancel button 870, and close button 880.

On the first GUI 800, the user can activate and deactivate the streaming video functionality. For example, the user can first activate the functionality to begin collecting images of the webpage. The user can stop the collection of images (e.g., deactivate the functionality) when the desired range of images are captured. In some embodiments, the user may be directed to an editing interface (e.g., the second GUI 820) that lets the user select what portion of the video they want to capture. In an embodiment, the individual screenshot frames can be transmitted to the computing device where they are assembled into a video preview.

The second GUI 820 may be displayed for the user after the user has captured a collection of images. The second GUI 820 can include an editing interface, which can be a layer provided on top of the image on a webpage (e.g., a screen). In the editing interface, the user can resize the area of the webpage that is captured, change the aspect ratio, and the like. The user can save the images through the editing interface. The collection of images can be transmitted to the computing device in the aspect ratio defined by the user. In an embodiment, screen captures of the entire browser can be saved at the computing device and cropped according to the user's specifications. In an embodiment, substantially all frames can be transmitted after the user presses stop. In another embodiment, the frames can be transmitted while the frames are being recorded. The screen captures can be series of images captured at a defined rate (e.g., 10 frames per second in JPG or PNG format).

In some embodiments, the video preview may be generated from a "progressive download" full video format (e.g., streaming video, HTTP progressive download). The progressive download may be provided from a computing device, such that the content from the full video is substantially independent of the time at which it was received or fetched. In some embodiments, the video preview may be fetched (e.g., HTTP request or other protocol transmission) and transcoded.

In some embodiments, the video preview may be generated from a streaming full video, including, for example, a traditional television broadcast transmitted through an internet protocol (IP) network. The streaming video can be provided from a computing device substantially dependent on the time at which it was received or fetched. In an illustrative example, a user would indicate that he or she wishes to create a video preview from a particular live video stream. The system (e.g., browser application, GUI) buffers the video stream and when the user indicates a particular time range for the video preview, then the system would use the buffered data to create a video preview. In another illustrative example, the user can indicate to the system that he or she wishes to begin the video preview creation given a live video stream (e.g., pressing a request button a first time). The system buffers the content received until the user indicates that the end of the video preview has been reached (e.g., pressing the request button a second time). At this point, the system creates the video preview based on the buffered data.

As shown in FIG. 2, the provider server 220 may allow the user device 230 to generate a video preview from a streaming full video format. For example, the video server 210 may provide a traditional television broadcast transmitted through an IP network. In this case, the streaming video is provided to the user device 230 from the video server 210. The user device 230 selects the request button a first time to start buffering the streaming video at the provider server 220. The provider server 220 requests the streaming video from the video server 210. The video server 210 provides the streaming video to the provider server 220 and begins storing the video data (e.g., buffering). The user device 230 selects the request button a second time to notify the provider server to stop buffering the streaming video. The provider server 220 generates the video preview based in part on the video received between the first and second request. The provider server 220 may then provide the video preview of the streaming video to the user device 230.

In some embodiments, the user device 230 selects the request button only one time to identify a timestamp, without selecting an end time. The provider server 220 can similarly request and receive the streaming video to start buffering the streaming video at the provider server 220, but generate a video preview for a particular duration, based on a predetermined length of time. The provider server 220 can generate the video preview based on the predetermined length of time and provide the video preview to the user device 230.

The second GUI 820 can include a scrollbar 840 and indicator 850. The scroll bar may be a representation of the video in terms of time. For example, the length of the scroll bar can represent 4 minutes, which could be the entire length of the video. If the indicator 850 is in the middle of the scroll bar, the position of the video may be at 2 minutes, or in the middle of the video.

Non-consecutive frames can be chosen as well. For example, a user can select several clips of a video that would play consecutively. In one embodiment, the second GUI 820 can contain a draggable gripper that enables the user to select a precise number of sections to use for the video preview. Multiple grippers could be added to the video timeline and numbered. Additionally, an uploading interface could enable users to upload individual scenes of videos (e.g., scenes the user made, frames or images found on external websites) and splice the scenes together to create a video preview with non-consecutive frames.

The second GUI 820 may also include a create button 860 and a cancel button 870. For example, once the user has selected the frames or time to use for the video portion, the user can select the create button 860 to create a video preview or the cancel button 870 to not create a video preview. The user may also press the close button 880 to close the second GUI 820 and return to the first GUI 800.

The second GUI 820 may also include a gripper (not shown). The gripper can be dragged by the user to resize the clipping box. The rounded grip control can resize the scale of the video track so that the user can easily zoom to a particular part of the video's track and scale it to a particular second. In an embodiment, the width and location of the gripper can be adjusted independently. For example, when the width of the gripper is expanded, the video preview can be adjusted from a 4-second video preview to a 10-second video preview. When the location of the gripper is adjusted, the original video preview that included a 4-second clip at 1 minute 31 seconds through 1 minute 35 seconds, can include a new 4-second video preview at 1 minute 57 seconds through 2 minutes 1 second. The gripper can help crop the video (e.g., shorten the duration of a full video, resize the dimensions of a full video) to generate a video preview.

IV. Playing Video Previews

Figure 9:
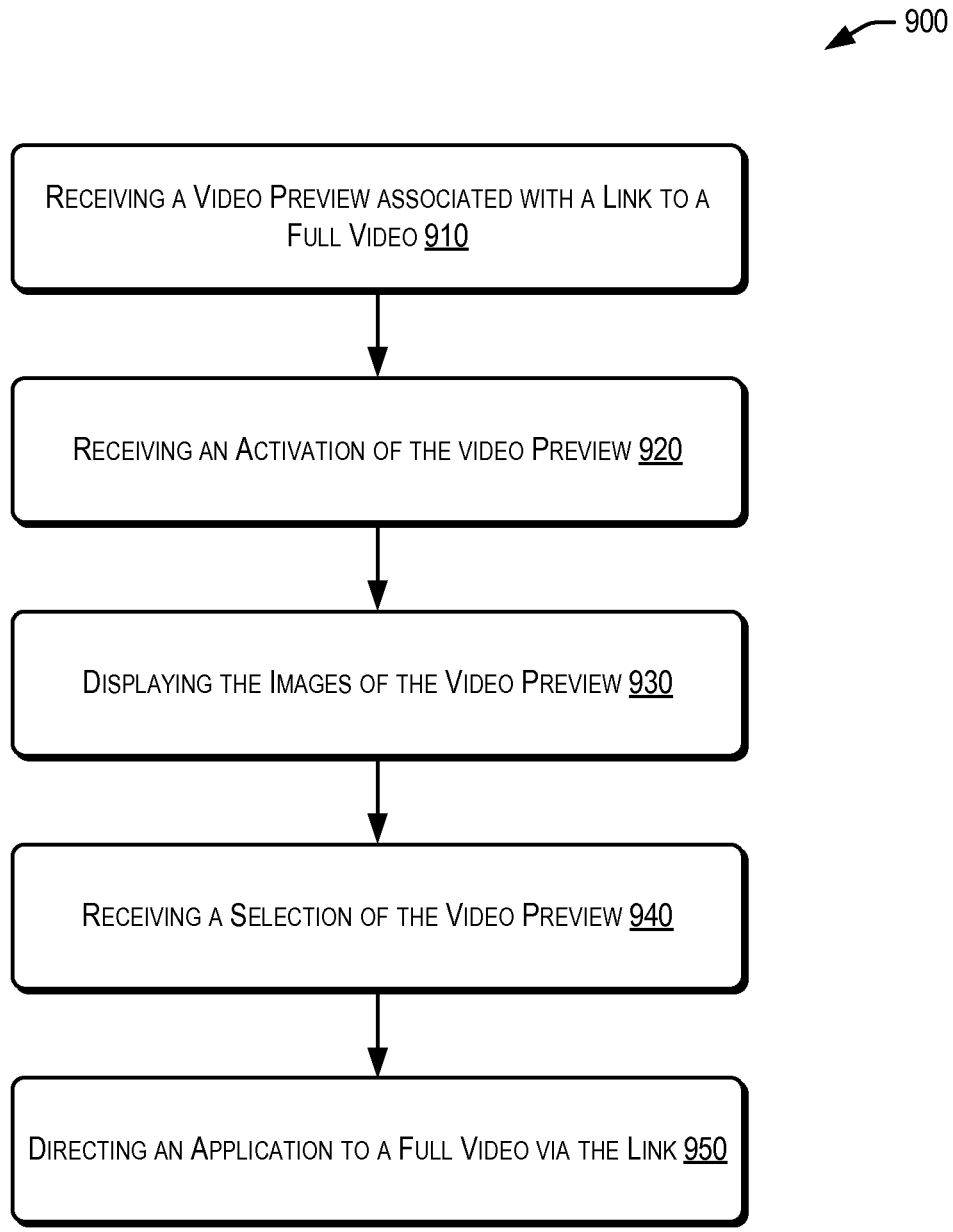
FIG. 9 shows a flowchart illustrating a method of playing a video preview according to an embodiment of the present invention.

FIG. 9 shows a flowchart illustrating a method of playing a video preview according to an embodiment of the present invention. For example, the created video preview can be provided to a computing device, which activates the video preview. When activated, the video preview plays the series of images.

At block 910, a video preview associated with a link to a full video can be received. The video preview may be received from a provider server 220 at a computing device (e.g., a user device 230, a third party server 240). In some embodiments, the link to the full video with the video preview may also be received at the computing device.

At block 920, an activation of the video preview may be received. In some examples, the activation may be based on the location of the video preview on a display of the computing device. The video preview can be provided by a GUI or other application used for displaying a video preview.

At block 930, images of the video preview may be displayed. For example, the images of the video preview may be displayed in response to the activation of the video preview.

At block 940, a selection of the video preview may be received. For example, the selection may be in response to an activation device (e.g., a finger, a mouse pointer) moving close to the video preview on the display and selecting (e.g., clicking, tapping, hovering). In some examples, the selection may be inferred after the video preview finishes playing a threshold number of times. The selection may be received subsequent to displaying at least some of the images of the video preview.

At block 950, an application may be directed to a full video associated with the link. For example, the application may be an application of the computing device and the direction to the link may be in response to selecting the video preview. The full video may be stored at a video server 210. In some embodiments, the link to the full video can direct the user to a webpage provided by the application (e.g., a browser application accessing the webpage). In other embodiments, the link to the full video can open a GUI that plays the full video stored at the computing device (e.g., locally).

The link to the full video may be used or transmitted to the computing device in various ways. For example, when the computing device is a user device 230, the link may be sent to the application operated by the user device 230 (e.g., web browser). The link may be populated in the application so that the user device 230 can quickly access the full video provided by a webpage. In another example, when the computing device is a third party server 240, the link may be sent to the application operated by the third party server 240 to incorporate with additional information (e.g., marketing material, a third party webpage). The application may be directed to the full video via the link, in order for the third party server 240 to incorporate the full video with the additional information.

In some embodiments, the link may be used when selecting the video preview. For example, when an activation device (e.g., mouse pointer) at the computing device selects (e.g., clicks, taps) the link associated with the full video, the application of the computing device can be directed to the full video via the link. In another example, the selection can be sent to the provider server 220, which can use the link to direct the application to obtain information from a third party server 240 or a full video stored at a video server 210.

V. Video Previews with More than One Layer of Data

In some embodiments, the video preview can include a caption. A caption can be text that enhances the video preview by displaying text in conjunction with the video preview as the video preview is playing. Users can add captions to particular segments of the video previews to convey speech between characters in a scene, or more generally communicate or label activity that is taking place. For example, captions can be expressive statements like "Eat Dirt" or "I can't believe he's doing this," or explanations for what is happening in the video. The captions may be modifiable through a GUI. The use of captions can be advantageous, especially when a video does not include sound, so that a particular idea can be conveyed with the combined video and caption.

The caption can be a soft caption or a hard caption. For example, a soft caption can include storing the text of the caption separately from the video preview and/or video preview object. Then, when the video preview object is displayed (e.g., on a computing device, via a network page), the caption is displayed on top of the video. For hard captioning, an additional video preview object can be generated that incorporates the caption with the video content. When displayed, the video preview object would include the video and the caption, without displaying an additional caption on top of the video.

Figure 10:
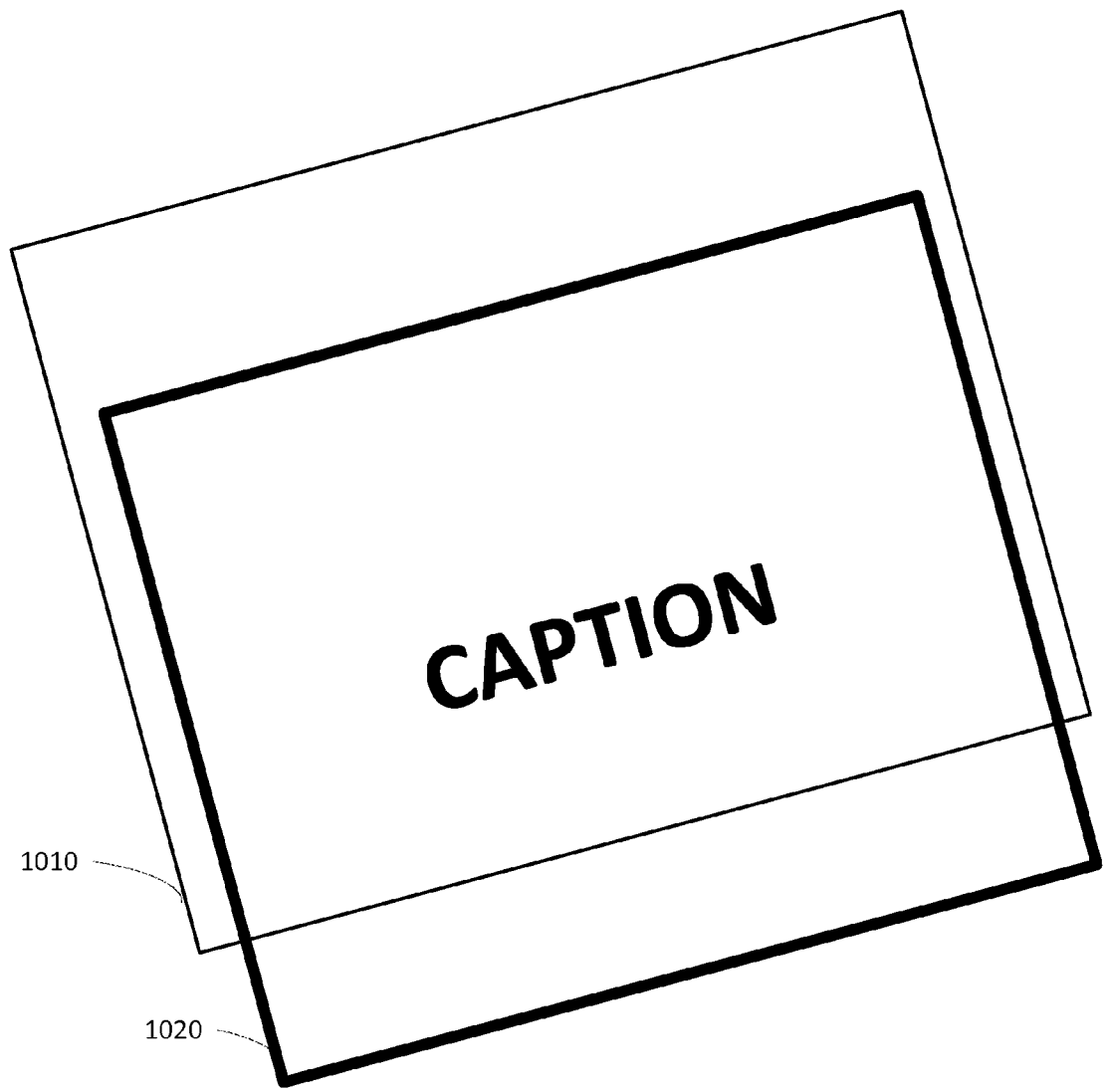
FIG. 10 shows an illustration of a caption and a video according to an embodiment of the present invention.

FIG. 10 shows an illustration of a "soft caption" according to an embodiment of the present invention. The illustration includes a 3-dimensional view a video preview with more than one layer of data, or a dual-layer file. The first layer can be the video preview and the second layer of data can be a caption (e.g., a soft caption). The video preview can be displayed in a first layer 1010 and the caption can be displayed in a second layer 1020. In an embodiment, the first layer 1010 and second layer 1020 can be displayed in the same space, so that the user sees a first layer behind a second layer. The second layer may be transparent, except for the text, so that the video preview can be seen through the second layer. The video preview can play in the background and the caption can cover part of the video preview. By using layers, the caption may be adjusted independently from the video preview. In some embodiments, "soft captioning" may be used to combine the portion of the video preview with the caption that overlaps with the video (e.g., where the caption can be displayed on top of the video preview layer without altering the video preview itself).

In some embodiments, the video preview may be transcoded in order to incorporate the caption with the video preview. The transcoding can be used to combine the video preview in a first layer 1010 and the caption in a second layer 1020, so that the video preview and the caption become a single-layered video preview. For example, this process may include "hard captioning."

In an embodiment, priorities may be assigned to the layers. For example, the second layer 1020 may have a higher priority than the first layer 1010, so the second layer is shown on top of the first layer. Priorities of the layers may be adjusted. For example, when a layer is a caption on top of the video, the layers may be editable by the user who creates the video preview.

The video preview and caption may be provided to the user in parallel. In an embodiment, the user may view an animated video preview and an animated caption, so that the video preview is playing at the same time the caption is playing. When the caption is playing, the caption may not visually move for the user, but instead, the animated caption can be static text that is displayed for a particular amount of time. In this sense, the caption can be played much like a video preview but without moving while it is played.

In an embodiment, the caption may move. For example, the caption can be associated with a position on a display (e.g., the (x,y) position). The caption location could be changed depending on the point in the video being played back.

The caption can be adjusted based on metadata. For example, if the viewer of the video preview uses a web browser that translates all webpages and text to Spanish, the caption can be translated to Spanish as well. The caption may be adjusted by color, font, size, position on a screen, or other options as well. The caption may be a "soft caption" that is independent of a video preview file, instead of a "hard caption" that is part of the file format. This is advantageous over other video systems that embed text with a video because in those systems, the text cannot be changed if the viewer's preferences are different than the video creator's initial choice. This may also help viewers see a smaller caption by adjusting the size of the text in the caption to be larger without adjusting the size of the video to be larger as well.

Figure 11:
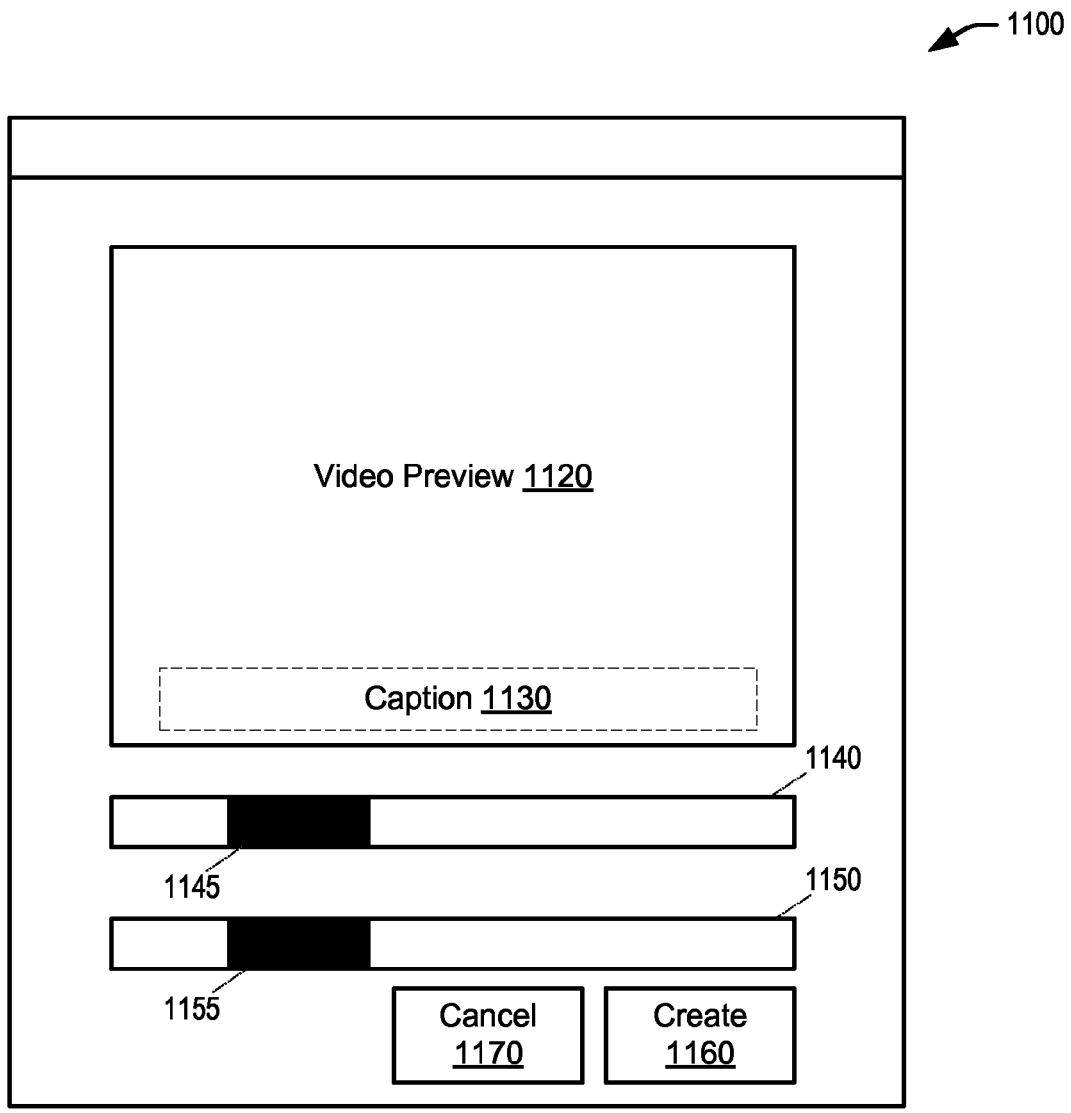
FIG. 11 shows an illustration of a caption and a video preview in a graphical user interface according to an embodiment of the present invention.

FIG. 11 shows an illustration of a caption and a video in a graphical user interface according to an embodiment of the present invention. The GUI 1100 may display a video preview 1120 and a caption 1130 to assist the user in generating a video preview with a corresponding caption using soft captioning or hard captioning.

One or more scrollbars 1140, 1150 may be provided. For example, a first scrollbar 1140 can correspond with the video preview and the second scrollbar 1150 can correspond with the caption. The scrollbars 1140, 1150 may allow the user to determine which images from the full video can be included in the video preview and which portions of the video preview can display the caption. In some embodiments, the scrollbar may be a single scrollbar allowing multiple indicators to appear on the same scrollbar (e.g., one for the video preview, a plurality for the plurality of captions).

One or more scrollbars 1140, 1150 may include a corresponding indicator 1145, 1155 respectively. The indicator 1145 for the video preview can show which portions of the full video should be included in the video preview. The indicator 1155 for the caption can show corresponding portions of the full video that should include a caption.

In some embodiments, the indicator 1155 can include text. The text may be the text (or a portion of the text) that corresponds with the caption. For example, the text on the indicator 1155 can say "caption 1" to identify the first caption of many captions that can be displayed at the particular time during the video preview 1120. In another example, the text on the indicator 1155 can say "the building just imploded!!" or "the building just . . . " to signify the text in the caption that can appear with the video preview.

In some embodiments, a gripper may be provided (not shown). The gripper can be dragged by the user to resize the clipping box. The rounded grip control can resize the scale of the video track so that the user can easily zoom to a particular part of the video's track and scale it to a particular second. In an embodiment, the width and location of the gripper can be adjusted independently. For example, when the width of the gripper is expanded, the video preview can be adjusted from a 4-second video preview to a 10-second video preview. When the location of the gripper is adjusted, the original video preview that included a 4-second clip at 1 minute 31 seconds through 1 minute 35 seconds, can include a new 4-second video preview at 1 minute 57 seconds through 2 minutes 1 second. The gripper can help crop the video to generate a video preview.

The GUI 1100 can also be used to add captions by hovering over a caption displayed on the video preview 1120. Hovering over a caption 1130 can result in grips appearing on the left and right of the caption text. The caption text can reveal controls, which let the user edit, move, or delete items displayed with the video preview. When a user clicks "Add Caption" (not shown), the video can pause during the editing of the video preview, and the text block can snap into place around the current elapsed time of the video preview. For example, if the user hovers over a caption for 2 seconds, the grips may appear. The captions may be limited in length (e.g., two lines) and positioned (e.g., by dragging the caption box). When a user selects another portion of the GUI 1100 unassociated with the caption 1130, the text properties can be replaced by an "add caption" button and the video can resume playing. When the GUI is used for video previews, a wrapper can be implemented such that it can pause when a caption is added or converted to an alternate format (e.g. WEBM).

A second caption can be added by clicking the "add caption" button or selecting the scrollbar 1150. When two or more captions are used, the captions can be positioned on the screen and/or overlap in the scrollbar 1150 or indicator 1155.

VI. Example Subsystems and Components

Figure 12:
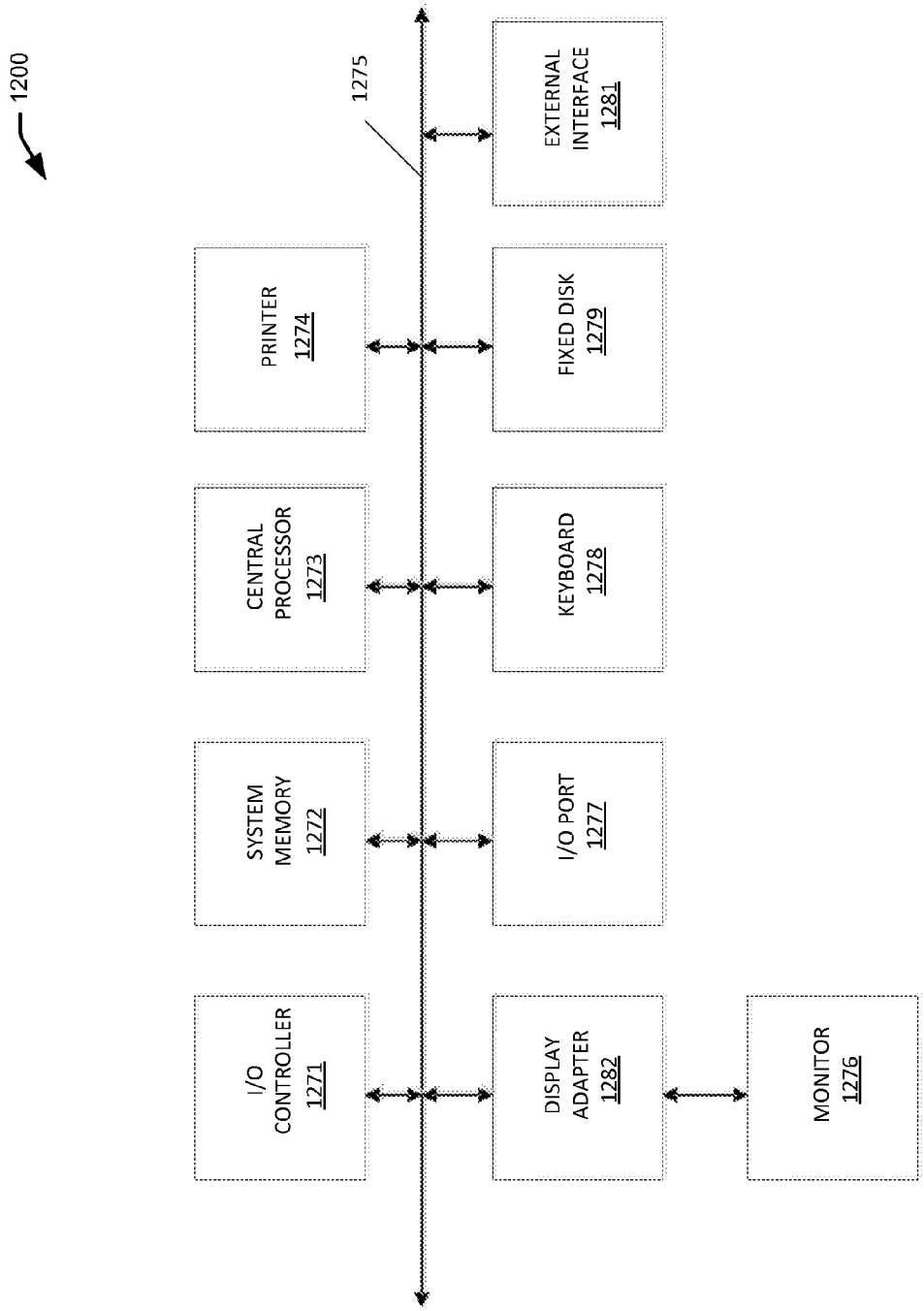
FIG. 12 shows a block diagram of a computer apparatus according to an embodiment of the present invention.

Any of the clients or servers may utilize any suitable number of subsystems. Examples of such subsystems or components are shown in FIG. 12. The subsystems shown in FIG. 12 are interconnected via a system bus 1275. Additional subsystems such as a printer 1274, keyboard 1278, fixed disk 1279, monitor 1276, which is coupled to display adapter 1282, and others are shown. Peripherals and input/output (I/O) devices, which couple to I/O controller 1271, can be connected to the computer system by any number of means known in the art, such as input/output (I/O) port 1277 (e.g., USB, FireWire®). For example, I/O port 1277 or external interface 1281 (e.g. Ethernet, Wi-Fi, etc.) can be used to connect the computer apparatus to a wide area network such as the Internet, a mouse input device, or a scanner. The interconnection via system bus allows the central processor 1273, which may include one or more processors, to communicate with each subsystem and to control the execution of instructions from system memory 1272 or the fixed disk 1279 (such as a hard drive or optical disk), as well as the exchange of information between subsystems. The system memory 1272 and/or the fixed disk 1279 may embody a computer readable medium. Any of the data mentioned herein can be output from one component to another component and can be output to the user.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java®, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive, a CD, or an entire computer system), and may be present on or within different computer program products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of creating a video preview, the method comprising:
    receiving a link to a full video at a computing device from a graphical user interface (GUI) executing on the computing device;
    receiving, by the computing device from the GUI, an identification of one or more video portions of the full video at the computing device, wherein the video portions include a series of copies of images from the full video, the one or more video portions consisting of images of the full video that have been identified as being viewed at least a threshold number of times;
    after receiving the link to the full video and the identification of the one or more video portions of the full video at the computing device, generating, by the computing device, a video preview from the identified video portions, wherein the video preview is configured to play the series of copies of images associated with images of the video portions from the full video when activated; and
    creating, by the computing device, a video preview object by combining the video preview and the link, wherein a selection of the video preview provides access to the full video.

2. The method of claim 1, wherein the computing device is a provider server and the identification of the video portion is received from a user.

3. The method of claim 1, wherein the video portion corresponds to non-sequential images from the full video.

4. The method of claim 1, further comprising:
    storing the full video at the computing device.

5. The method of claim 1, further comprising:
    receiving a specified number of frames per second; and
    generating the video preview at an altered frame rate associated with the specified number of frames per second.

6. The method of claim 5, wherein the altered frame rate is less than a frame rate in the full video.

7. The method of claim 5, further comprising:
    displaying the altered frame rate on the graphical user interface (GUI).

8. The method of claim 1, wherein the user identifies the video portion of the full video by rewinding the full video so that the full video replays the video portion more than once.

9. The method of claim 1, wherein the link to the full video is included in a push notification, wherein the push notification is a request to generate a video preview.

10. The method of claim 1, wherein the full video is a portion of the full video, and wherein the computing device supports transcoding functionality.

11. The method of claim 1, wherein a duration of the video preview is a predetermined length of time.

12. The method of claim 1, further comprising:
receiving a caption;
correlating the video preview with a first layer;
correlating the caption with a second layer, such that the second layer is displayed with the first layer for a user; and
creating a dual-layer file with the correlated video preview and caption.

13. A method of claim 12 further comprising:
assigning a first priority with the first layer;
assigning a second priority with the second layer; and
providing the first layer beneath the second layer in the dual-layer file when the first priority is less than the second priority.

14. The method of claim 1, wherein the full video is located at a destination location, and the method further comprising:
receiving the destination location; and
in response to receiving a selection, directing a browser to the destination location.

15. The method of claim 1, further comprising:
uploading the video preview object to a server.

16. A computer product comprising a non-transitory computer readable medium storing a plurality of instructions that when executed control a computer system to creating a video preview, the instructions comprising:
receive a link to a full video from a graphical user interface (GUI) executing on the computing device;
receive, by the computing device from the GUI, an identification of one or more video portions of the full video, wherein the video portions include a series of copies of images from the full video;
defining one or more sections that have been viewed at least a threshold number of times from the series of copies of images from the full video;
after receiving the link to the full video and the identification of the one or more video portions of the full video at the computing device, generate a video preview from the one or more sections, wherein the video preview is configured to play the series of copies of images associated with images of the video portions from the full video when activated; and
create, by the computing device, a video preview object by combining the video preview and the link, wherein a selection of the video preview provides access to the full video.

17. A method of creating a video preview, the method comprising:
for each of a plurality of images of a full video:
receiving, at a computing device, a number of times that the image has been viewed by a plurality of users;
identifying, by the computing device, images of the full video that have been viewed at least a threshold number of times based on the number of times that each of the images of the full video been viewed, wherein the threshold number of times that each of the images has been viewed is relative to a number of times that one or more other images of the full video have been played;
defining one or more sections that have been viewed at least the threshold number of times by identifying a first series of images from the full video that have been viewed at least the threshold number of times; and
generating, by the computing device, a video preview from the one or more sections, wherein the video preview is configured to display the first series of images from the full video associated with the identified one or more sections when activated.

18. The method of claim 17, wherein the threshold number of times is at least double a number of times that other sections are viewed by the plurality of users.

19. The method of claim 17, further comprising:
defining a second one or more sections that have been viewed at least the threshold number of times by identifying a second series of images from the full video that have been viewed at least the threshold number of times; and
generating, by the computing device, a second video preview from the second one or more sections, wherein the second video preview is configured to display the second series of images from the full video associated with the identified one or more sections when activated.

20. The method of claim 19, further comprising:
transmitting, by the computing device, the generated first video preview and second video preview to a shared repository.

21. A method of viewing a video preview, the method comprising:
receiving, from a provider server at a computing device, a plurality of video previews that are associated with full videos, wherein the plurality of video previews include a video preview that includes a plurality of copies of images of a full video;
displaying more than one of the plurality of video previews on a display of the computing device;
receiving an activation of the video preview;
displaying the images of the video preview in response to the activation of the video preview, wherein the activation of the video preview automatically occurs based on a window of the video preview being at a specified location on a display of the computing device;
receiving a selection of the video preview subsequent to displaying at least some of the images of the video preview, the selection of the video preview being of a displayed image of the video preview; and
in response to selecting the video preview, directing an application of the computing device to the full video, the full video stored at a video server.

22. The method of claim 21, wherein a link to the full video directs the user to a webpage provided by a browser.

23. The method of claim 21 further comprising:
receiving, at the computing device, a link to the full video with the video preview; and
directing the application to the full video via the link.

24. The method of claim 21, wherein the selection is sent to the provider server, which directs the application to the full video stored at the video server, wherein the provider server creates the video preview object by combining the video preview and the link.

25. The method of claim 21, wherein a link to the full video opens a GUI that plays the full video stored at the computing device.

26. The method of claim 21, further comprising:
identifying that the video preview has moved to a location on the display at the computing device, wherein the movement to the location on the display initiates the activation of the video preview.

* * * * *